(12) United States Patent
Hong et al.

(10) Patent No.: US 9,266,266 B2
(45) Date of Patent: Feb. 23, 2016

(54) CASE OF ELECTRONIC DEVICE HAVING ANTENNA PATTERN FRAME EMBEDDED THEREIN, MOLD THEREFOR AND METHOD OF MANUFACTURING THEREOF

(75) Inventors: Ha Ryong Hong, Gyunggi-do (KR); Sung Eun Cho, Gyunggi-do (KR); Ki Won Chang, Gyunggi-do (KR); Chang Mok Han, Chungcheongnam-do (KR); Dae Kyu Lee, Gyunggi-do (KR); Dae Seong Jeon, Gyunggi-do (KR); Chan Gwang An, Gyunggi-do (KR); Jae Suk Sung, Gyunggi-do (KR); Duk Woo Lee, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 820 days.

(21) Appl. No.: 13/099,930

(22) Filed: May 3, 2011

(65) Prior Publication Data
US 2011/0279333 A1 Nov. 17, 2011

(30) Foreign Application Priority Data

May 11, 2010 (KR) .......................... 10-2010-0044185
Jan. 25, 2011 (KR) .......................... 10-2011-0007346

(51) Int. Cl.
*H01Q 1/24* (2006.01)
*B29C 45/14* (2006.01)
(Continued)

(52) U.S. Cl.
CPC ....... *B29C 45/14065* (2013.01); *B29C 45/1671* (2013.01); *H01Q 1/243* (2013.01); *H01Q 1/40* (2013.01); *H01Q 5/40* (2015.01); *H01Q 7/00* (2013.01); *H01Q 9/0421* (2013.01); *B29C 45/0046* (2013.01); *B29C 45/14418* (2013.01); *B29C 45/14639* (2013.01); *B29C 45/14778* (2013.01); *B29C 45/14836* (2013.01); *B29C 2045/0049* (2013.01); *B29L 2031/3431* (2013.01); *B29L 2031/3437* (2013.01); *B29L 2031/3456* (2013.01); *B29L 2031/3481* (2013.01)

(58) Field of Classification Search
USPC .................................. 343/702, 725–726, 741
See application file for complete search history.

(56) References Cited

U.S. PATENT DOCUMENTS

| 4,944,087 A | 7/1990 | Landi |
| 6,396,444 B1 | 5/2002 | Goward et al. |

(Continued)

FOREIGN PATENT DOCUMENTS

| CN | 1336020 A | 2/2002 |
| CN | 101043098 A | 9/2007 |

(Continued)

OTHER PUBLICATIONS

European Search Report issued in European Patent Application No. EP 11250431.1 dated Aug. 19, 2011.

(Continued)

*Primary Examiner* — Matthew Mikels
(74) *Attorney, Agent, or Firm* — NSIP Law

(57) ABSTRACT

There is provided a case of an electronic device having an antenna pattern embedded therein, the case including: a radiator frame injection molded so that a radiator including an antenna pattern part and formed on a film is formed on one surface thereof; a case frame injection molded upwardly of the radiator frame and provided with the radiator embedded between the radiator frame and the case frame; and a boundary part forming a boundary between the radiator frame and the case frame and having a groove formed inwardly of the case frame.

21 Claims, 30 Drawing Sheets

(51) Int. Cl.
*B29C 45/16* (2006.01)
*H01Q 1/40* (2006.01)
*H01Q 7/00* (2006.01)
*H01Q 9/04* (2006.01)
*H01Q 5/40* (2015.01)
*B29C 45/00* (2006.01)
*B29L 31/34* (2006.01)

(56) References Cited

U.S. PATENT DOCUMENTS

| | | | |
|---|---|---|---|
| 2003/0098814 A1* | 5/2003 | Keller et al. | 343/742 |
| 2005/0264460 A1* | 12/2005 | Sunaga | 343/702 |
| 2006/0216469 A1 | 9/2006 | Hashizume et al. | |
| 2006/0267853 A1 | 11/2006 | Naito | |
| 2007/0040755 A1 | 2/2007 | Na et al. | |
| 2007/0216580 A1 | 9/2007 | Lin et al. | |
| 2008/0067715 A1 | 3/2008 | Sung | |
| 2008/0095929 A1 | 4/2008 | Sung et al. | |
| 2009/0015490 A1 | 1/2009 | Honda et al. | |
| 2009/0015507 A1 | 1/2009 | Hong et al. | |
| 2009/0051602 A1* | 2/2009 | Jeon et al. | 343/700 R |
| 2009/0059543 A1 | 3/2009 | Choe et al. | |
| 2009/0135083 A1 | 5/2009 | Guo | |
| 2010/0177013 A1 | 7/2010 | Wirth et al. | |
| 2010/0234082 A1 | 9/2010 | Hong et al. | |
| 2010/0271270 A1 | 10/2010 | Sung et al. | |
| 2010/0271283 A1 | 10/2010 | Sung et al. | |
| 2011/0279333 A1 | 11/2011 | Hong et al. | |

FOREIGN PATENT DOCUMENTS

| | | |
|---|---|---|
| CN | 101114731 A | 1/2008 |
| CN | 201234285 Y | 5/2009 |
| EP | 1 783 858 A1 | 5/2007 |
| FR | 2 806 343 A1 | 9/2001 |
| JP | 58-020418 A | 2/1983 |
| JP | 61-268415 A | 11/1986 |
| JP | 62-221521 A | 9/1987 |
| JP | 06-253910 A | 9/1994 |
| JP | 07-088888 A | 4/1995 |
| JP | 08-276458 A | 10/1996 |
| JP | 2001-277287 A | 10/2001 |
| JP | 2003-158415 A | 5/2003 |
| JP | 2004-534436 A | 11/2004 |
| JP | 2005-521236 A | 7/2005 |
| JP | 2005-277607 A | 10/2005 |
| JP | 2005-333244 A | 12/2005 |
| JP | 2005-341027 A | 12/2005 |
| JP | 2007-116347 A | 5/2007 |
| JP | 2008-072721 A | 3/2008 |
| JP | 2008-205557 A | 9/2008 |
| JP | 2008-226099 A | 9/2008 |
| JP | 2009-021932 A | 1/2009 |
| JP | 2009-022001 A | 1/2009 |
| JP | 2009-055627 A | 3/2009 |
| KR | 10-2007-0044140 A | 4/2007 |
| KR | 10-0764757 B1 | 10/2007 |
| KR | 10-2008-0004656 A | 1/2008 |
| KR | 10-0910161 B1 | 7/2009 |
| KR | 10-0930207 B1 | 12/2009 |
| KR | 10-0932079 B1 | 12/2009 |
| KR | 10-0935954 | 1/2010 |
| KR | 10-0945117 B1 | 3/2010 |
| WO | 00/39883 A1 | 7/2000 |
| WO | WO-02/082582 A1 | 10/2002 |
| WO | WO-03/046950 A2 | 6/2003 |
| WO | WO-2008/125399 A1 | 10/2008 |

OTHER PUBLICATIONS

Extended European Search Report issued in European Patent Application No. 11250429.5, dated Aug. 24, 2011.
Chinese Office Action issued in Chinese Application No. 201110127142.0 dated Jul. 2, 2013 with English Translation.
United States Office Action issued in U.S. Appl. No. 13/103,398 dated Jul. 17, 2013.
Extended European Search Report issued in European Patent Application No. EP 11250432.9 dated Aug. 25, 2011.
Korean Office Action, with English translation, issued in Korean Patent Application No. 102010-0044183, dated Sep. 14, 2011.
Office Action Chinese Patent Application No. 201110124913.0 dated Aug. 27, 2013 with English translation.
Japanese Office Action, and English translation thereof, issued in Japanese Patent Application No. 2011-083549 dated Nov. 20, 2012.
Chinese Office Action issued in Chinese Application No. 201110124913.0 dated May 15, 2014, w/English translation.
Chinese Office Action issued in Chinese Application No. 201110124875.9 dated May 8, 2014, w/English translation.
Chinese Office Action,w/ English translation thereof, issued in Chinese Patent Application No. CN 201110127142.0 dated Mar. 28, 2014.
United States Office Action issued in U.S. Appl. No. 13/103,297 dated Mar. 11, 2014.
Chinese Office Action issued in counterpart Chinese Patent Application No. 201110124875.9 on Aug. 23, 2013; 26 pages with English translation.
Japanese Office Action, w/ English translation thereof, issued in Japanese Patent Application No. JP 2011-083561 dated Dec. 4, 2012.
European Office Action issued on Oct. 7, 2015, in counterpart European Application No. 11 250 429.5 (4 pages, in English).
European Office Action issued on Oct. 7, 2015, in counterpart European Application No. 11 250 432.9 (5 pages, in English).

* cited by examiner

CASE OF ELECTRONIC DEVICE HAVING ANTENNA PATTERN FRAME EMBEDDED THEREIN, MOLD THEREFOR AND METHOD OF MANUFACTURING THEREOF

CROSS-REFERENCE TO RELATED APPLICATIONS

This application claims the priority of Korean Patent Application Nos. 10-2010-0044185 filed on May 11, 2010 and 10-2011-0007346 filed on Jan. 25, 2011, in the Korean Intellectual Property Office, the disclosure of which is incorporated herein by reference.

BACKGROUND OF THE INVENTION

1. Field of the Invention

The present invention relates to an electronic device case having an antenna pattern frame embedded therein, a mold therefor and a method of manufacturing thereof.

2. Description of the Related Art

Electronic devices such as mobile communications terminals, for example, cellular phones, PDAs, navigation devices, notebook computers, or the like, supporting wireless communications, are necessities in modern society. Mobile communications terminals have been developed to include a variety of functions, such as CDMA, wireless LAN, GSM, DMB, or the like. One of the most important parts of an electronic device that enables these functions is an antenna.

The antenna used in the mobile communications terminal has evolved from an exterior type antenna, such as a rod antenna or a helical antenna, to an interior type antenna mounted within the terminal.

However, the exterior type antenna is vulnerable to external impacts, while the interior type antenna increases the volume of the terminal.

In order to solve these defects, research into integrating the antenna into the mobile communications terminal has been actively conducted.

As a method of integrating the antenna into the mobile communications terminal, a method of adhering a flexible antenna to a body of the mobile communications terminal itself using an adhesive, or a method of molding an antenna film so that the antenna film is formed on an outer surface of the mobile communications terminal, has recently been suggested.

However, in the case of simply adhering the flexible antenna to the body of the mobile communications terminal using an adhesive, when the adhesive force thereof is reduced, the reliability of the antenna is deteriorated. In addition, the appearance thereof may be defective, providing unsatisfactory emotional appeal to consumers.

In addition, in the case of molding the antenna film so that the antenna film is formed on the outer surface of the mobile communications terminal, the security of a product is ensured; however, the antenna film may be separated from an injection molding product due to the elasticity of the antenna film itself.

SUMMARY OF THE INVENTION

An aspect of the present invention provides a case of an electronic device in which an antenna pattern frame is injection-molded not so as to be moved or deformed by injection pressure within a mold thereof.

Another aspect of the present invention provides a mold and a method of manufacturing the case of the electronic device.

Another aspect of the present invention provides a mold of a case of an electronic device in which even though a conductive ink or a film type radiator frame is used, the conductive ink or the film type radiator frame may endure high temperature and high pressure injection molding conditions within the mold of the case of the electronic device.

Another aspect of the present invention provides a case of an electronic device having a low frequency antenna pattern embedded therein, a mold and a method of manufacturing the same.

According to an aspect of the present invention, there is provided a case of an electronic device having an antenna pattern embedded therein, the case including: a radiator frame injection molded so that a radiator including an antenna pattern part and formed on a film is formed on one surface thereof; a case frame injection molded upwardly of the radiator frame and provided with the radiator embedded between the radiator frame and the case frame; and a boundary part forming a boundary between the radiator frame and the case frame and having a groove formed inwardly of the case frame.

The radiator frame may include a through hole, and the antenna pattern part may include a loop antenna wound around an outer portion of the through hole.

The through hole may be inserted into an inner boundary jaw of a mold of the case of an electronic device through which the case frame is injection molded.

The case frame and the through hole may be provided with a through hole boundary groove formed at a boundary therebetween.

The through hole boundary groove may have an inclination, a depth of which becomes shallower in a direction from the through hole toward the case frame formed at an inner portion of the through hole.

The case frame formed at an outer portion of the radiator frame and the radiator frame may be provided with an outer boundary groove formed at a boundary therebetween.

The outer boundary groove may have an inclination, a depth of which becomes shallower in a direction from the radiator frame toward the case frame formed at an outer portion of the radiator frame.

The antenna pattern part may include an antenna coil wound multiple times so that a low frequency signal may be transmitted or received.

The radiator frame may include an over-mold part formed to cover a portion of each of adjacent antenna pattern parts.

The radiator frame may include an over-mold part formed to cover all antenna pattern parts adjacent thereto.

The radiator may include a connection terminal part formed on one surface of the radiator frame, and the connection terminal part may be injection molded to be exposed on a connection terminal support formed to protrude to an outer portion of the radiator frame.

The connection terminal support may include an interconnection hole formed in a position corresponding to that of the connection terminal part.

The radiator frame may include an outer jaw disposed to be higher than an upper surface of the radiator.

The radiator may include at least two differently patterned antenna pattern parts.

The film may be made of a polymer plastic material containing a Cu component.

According to another aspect of the present invention, there is provided a mold of a case of an electronic device, the mold including: upper and lower molds contacted with and supported by a radiator frame injection molded so that a radiator including an antenna pattern part and formed on a film is formed on one surface thereof; a resin material inlet formed at the upper mold, the lower mold, or the upper and lower molds and having a resin material introduced thereinto so that a case frame shaped inner space formed by combining the upper and lower molds becomes a case frame; and a boundary part forming part provided to at least one of the upper and lower molds and having the radiator frame inserted thereinto.

The boundary part forming part may include a protrusion protruding from the upper mold or the lower mold so that an outer circumferential portion defining an outer boundary of the radiator frame and an inner circumferential portion of a through hole formed in the radiator frame are inserted thereinto.

The boundary part forming part may have an increasing inclination in a direction in which the resin material moves in the inner space.

The boundary part forming part may have an inclination so that the introduced resin material first contacts an upper surface of the radiator frame.

The boundary part forming part may have a large height at a boundary part of the radiator frame and a reduced height toward the inner space.

The resin material inlet may be formed at an outer portion of the boundary part forming part.

The boundary part forming part may include an inclination part guiding the resin material to be inclined upwardly or downwardly within the case frame shaped inner space and a flat part continuously extended from the inclination part and guiding the resin material horizontally.

The inclination part may have a tangential gradient of a bottom surface increased in a moving direction of an injection molding liquid.

A height of the flat part may correspond to that of the radiator frame.

The boundary part forming part may include the inclination part guiding the resin material to be inclined upwardly or downwardly within the case frame shaped inner space and having a tangential gradient of a bottom surface increasing in a moving direction of the injection molding liquid.

A height of the inclination part may correspond to that of the radiator frame.

The boundary part forming part may include the inclination part guiding the resin material to be inclined upwardly or downwardly within the case frame shaped inner space and having a tangential gradient of a bottom surface increasing and then decreasing at any one point thereof.

According to another aspect of the present invention, there is provided a method of manufacturing a case of an electronic device, the method including: forming a radiator including an antenna pattern part on a film; injection molding a radiator frame so that the radiator formed on the film is formed on one surface thereof; allowing an outer circumferential surface of the radiator frame to be inserted into and seated in an inner side of a boundary part forming part formed in a mold of the case of the electronic device; and allowing a resin material to be introduced from an outer side of the boundary part forming part, pass through the boundary part forming part, be filled from an upper surface of the radiator frame and be then filled in a case frame shaped inner space formed in the mold of the case of the electronic device.

The radiator frame may be molded so that a through hole is formed at an inner side of the antenna pattern part, and the radiator frame may be seated in the mold of the case of the electronic device including the boundary part forming part into which the through hole is inserted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
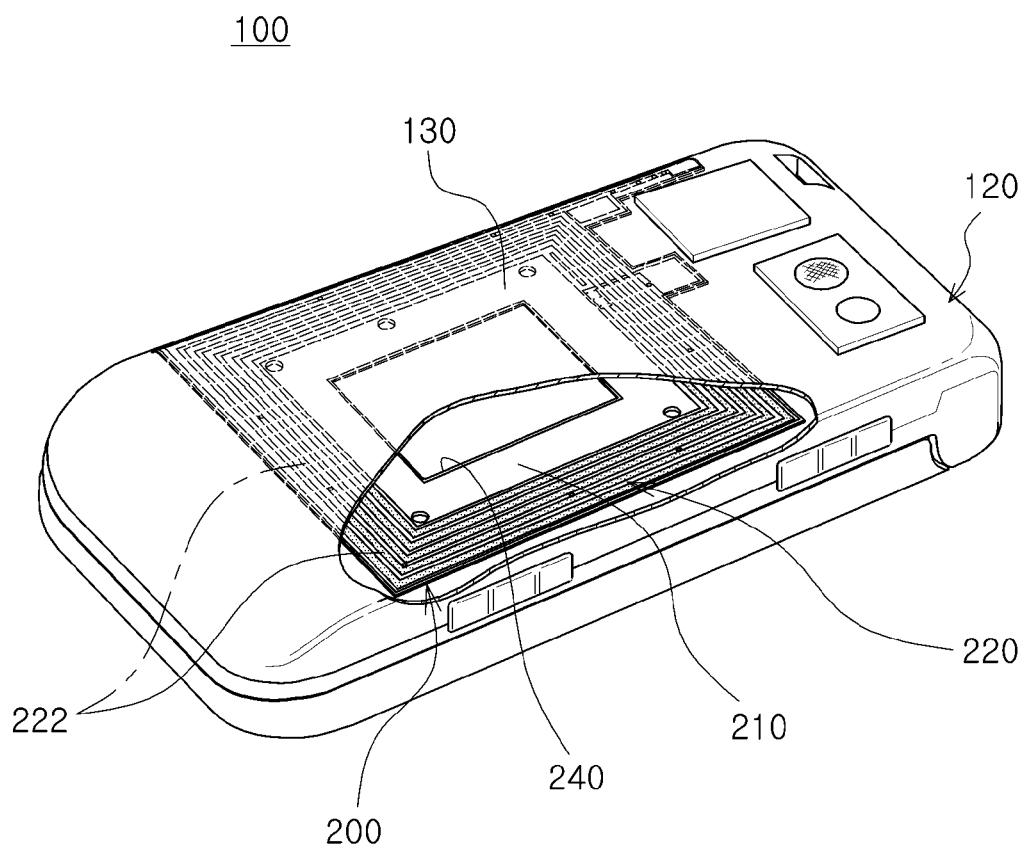
FIG. 1 is a partially cutaway schematic perspective view showing a of an electronic device, a mobile communications terminal according to an exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, throughout the drawings, the same or similar reference numerals will be used to designate the same or like components having the same functions in the scope of a similar idea.

Figure 2:
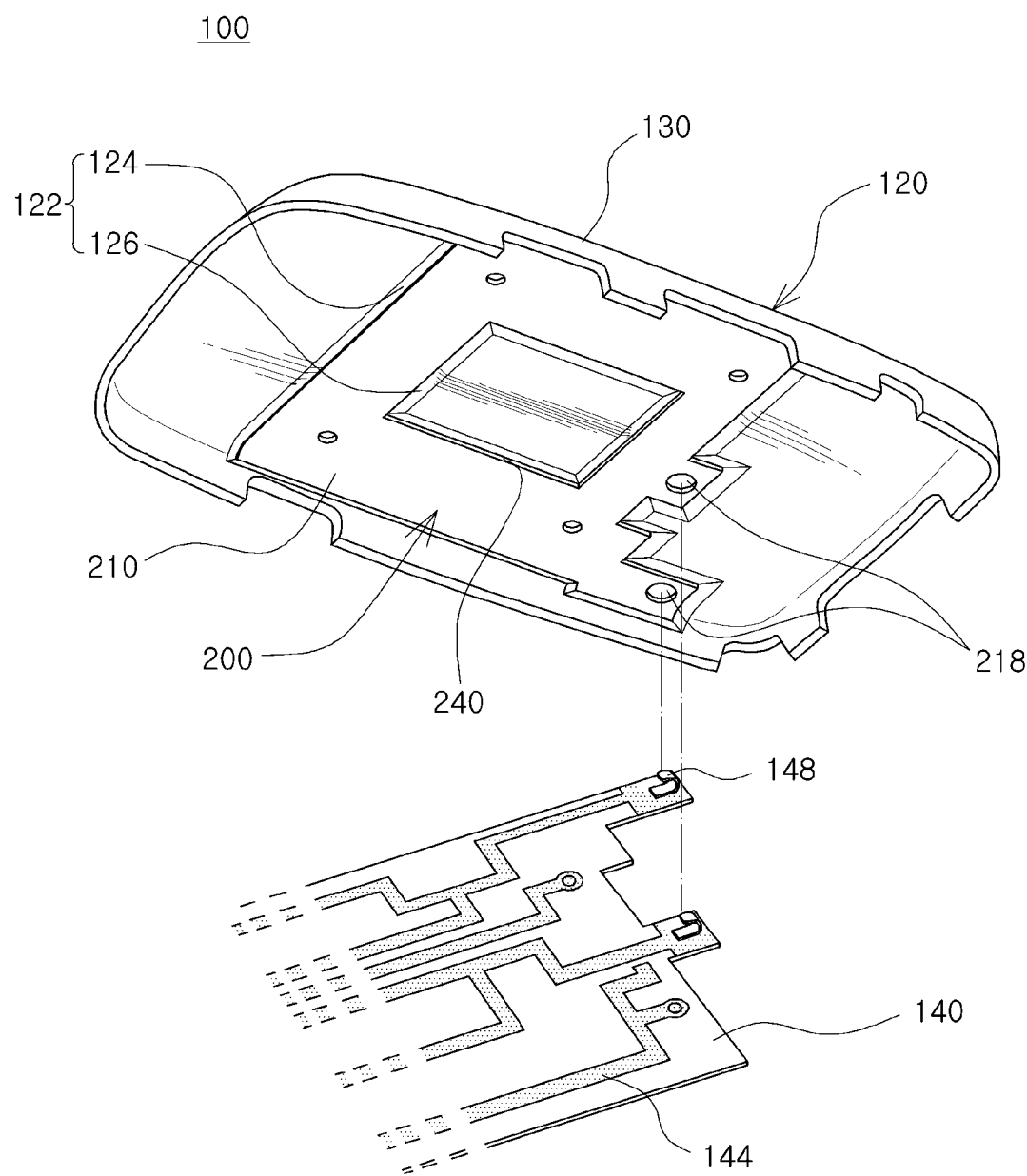
FIG. 2 is an exploded perspective view of a mobile communications terminal manufactured using an antenna pattern frame according to an exemplary embodiment of the present invention.

FIG. 1 is a partially cutaway schematic perspective view showing a partially cutaway case of an electronic device, a mobile communications terminal according to an exemplary embodiment of the present invention; and FIG. 2 is an exploded perspective view of a mobile communications terminal manufactured using an antenna pattern frame according to an exemplary embodiment of the present invention.

Referring to FIGS. 1 and 2, a radiator 220 including an antenna pattern part 222 is embedded in a case 120 of an electronic device, a mobile communications terminal 100 according to an exemplary embodiment of the present invention.

A radiator frame 210 having the antenna pattern part 222 formed therein is required so that the antenna pattern part 222 may be embedded in the case 120 of the electronic device.

Electronic Device and Case of Electronic Device

The mobile communications terminal 100 may be configured to include an antenna pattern frame 200, a case frame 130, and a printed circuit board 140.

As shown in FIGS. 1 and 2, the antenna pattern frame 200 may be fixed to an inner portion of the case frame 130 of the mobile communications terminal 100. Further, as will be described in detail below, the antenna pattern frame 200 may be injection-molded by a mold 400 for the electronic device for manufacturing the case 120 of the electronic device, such that the frame 200 may be integrated with the case frame 130.

The printed circuit board 140 may be provided with circuit elements that are mounted thereon and that transmit and receive signals to and from the antenna pattern part 222 of the radiator frame 210. Further, a connection wiring 144 connected to a connection terminal part 224 of the antenna pattern frame 200 may be formed on the printed circuit board 140.

The case 120 of the electronic device may include the radiator frame 210, the radiator 220, and the case frame 130.

The radiator frame 210 may be formed by injection molding a polymer plastic injection molding liquid.

The radiator 220 may have the antenna pattern part 222 capable of transmitting or receiving a signal in an appropriate band.

The case frame 130 may be formed to be injection molded upwardly of the radiator 220, such that the radiator 220 may be embedded between the radiator frame 210 and the case frame 130.

The radiator frame 210 may be a plate made of plastic, and the plate may have a through hole 240 in the center thereof. In this configuration, the antenna pattern part 222 may include a loop antenna wound around an outer portion of the through hole 240.

A through hole boundary groove 126 may be formed at a boundary between the case frame 130 and the through hole 240. Here, the through hole boundary groove 126 may have an inclination, a depth of which becomes shallower in a direction from the through hole 240 toward the case frame 130.

In addition, an outer boundary groove 124 may be formed at a boundary between the case frame 130 formed at an outer portion of the radiator frame 210 and the radiator frame 210. Here, the outer boundary groove 124 may have an inclination, a depth of which becomes shallower in a direction from the radiator frame 210 toward the case frame 130 formed at an outer portion of the radiator frame 210.

Figure 8A:
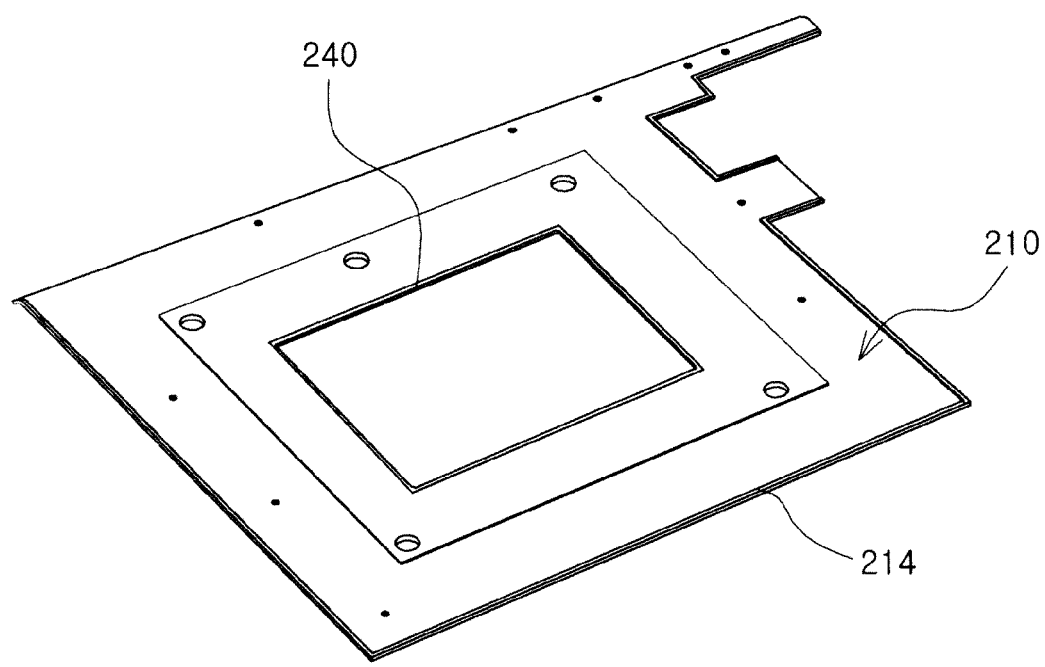
FIGS. 8A through 8D are schematic perspective views showing operations for manufacturing an antenna pattern frame of FIG. 3 and a case of a mobile communications terminal using the antenna pattern frame.
Figure 8B:
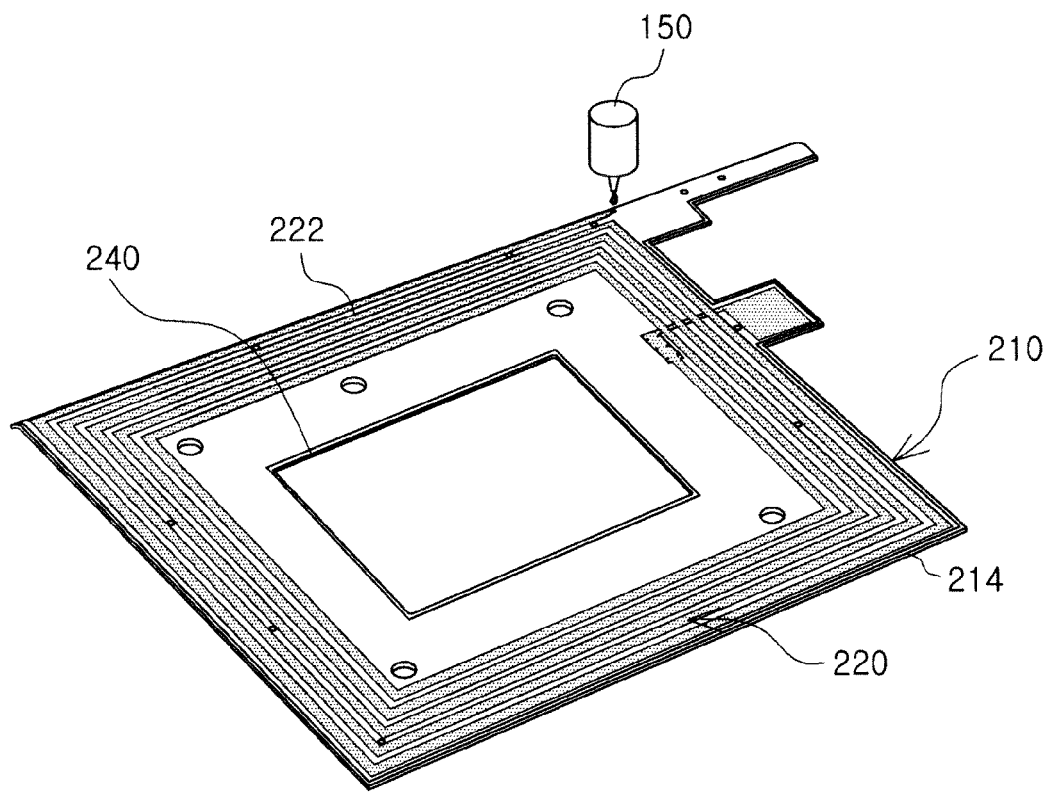
Figure 8C:
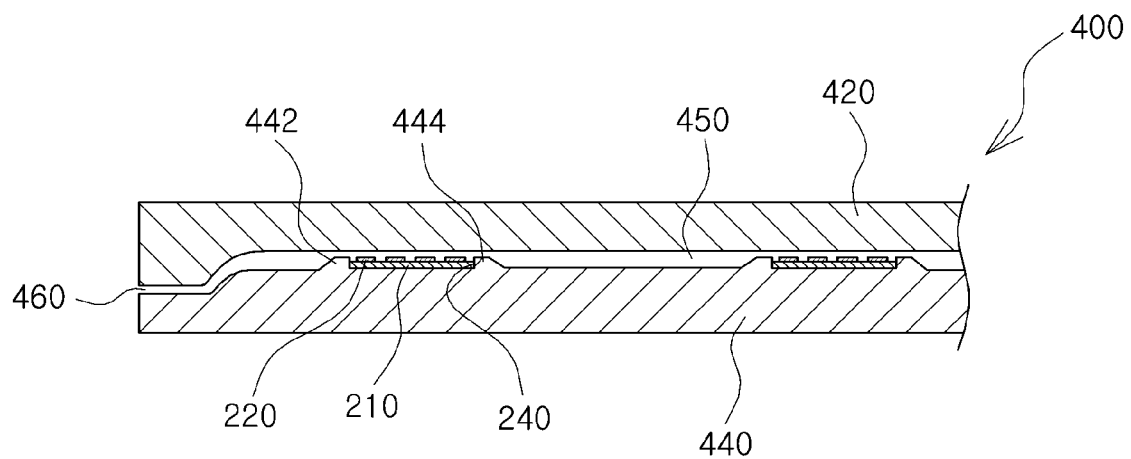
Figure 8D:
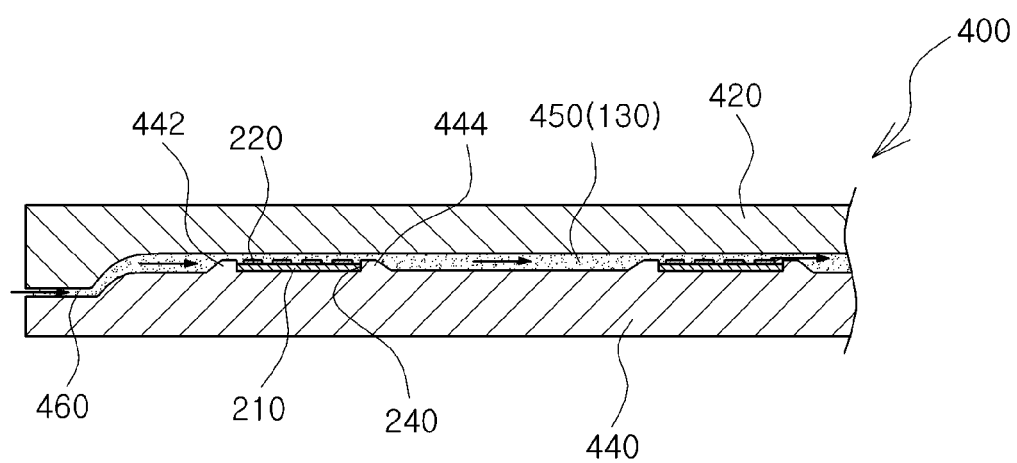

A boundary part 122 of the radiator frame 210 including the through hole boundary groove 126 and the outer boundary groove 124 may be formed by boundary jaws 442 and 444 formed in the mold 400 for the case of the electronic device described below as shown in FIGS. 8C and 8D.

When the case frame 130 is injection molded, the boundary jaws 442 and 444 may reduce the phenomenon in which a high temperature and high pressure injection molding liquid directly pushes against a bottom surface of a side of the radiator frame 210 disposed in the mold 400 for the case of the electronic device.

That is, the boundary jaws 442 and 444 may improve flow of the injection molding liquid toward the radiator frame 210, and also weaken an injection molding pressure applied to the radiator frame 210, whereby the antenna pattern frame 200 may be stably disposed within the mold 400 for the case of the electronic device.

Therefore, defects in the appearance of the case 120 of the electronic device may be improved, and stable antenna radiating characteristics may be secured.

Figure 3:
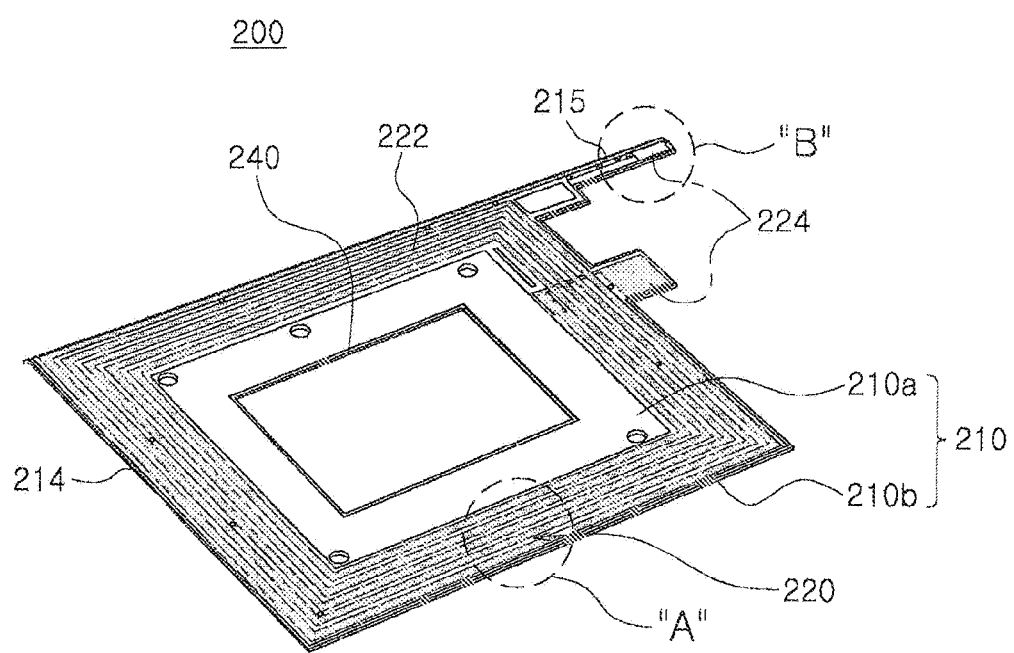
FIG. 3 is a schematic perspective view showing an antenna pattern frame according to a first exemplary embodiment of the present invention.
Figure 4:
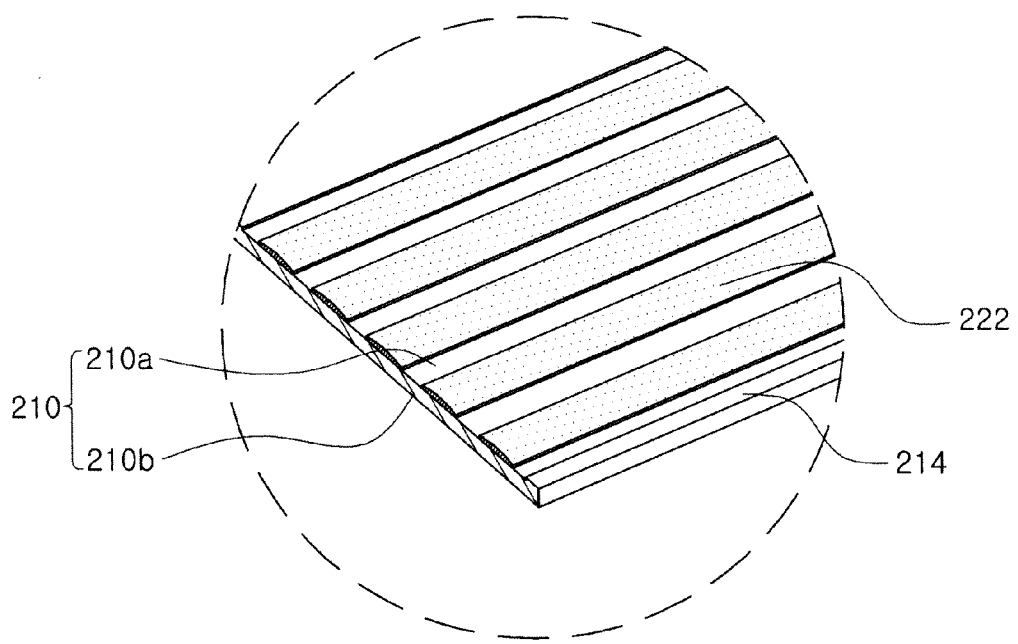
FIG. 4 is an enlarged perspective view showing part A of FIG. 3 according to a first exemplary embodiment of the present invention.
Figure 5:
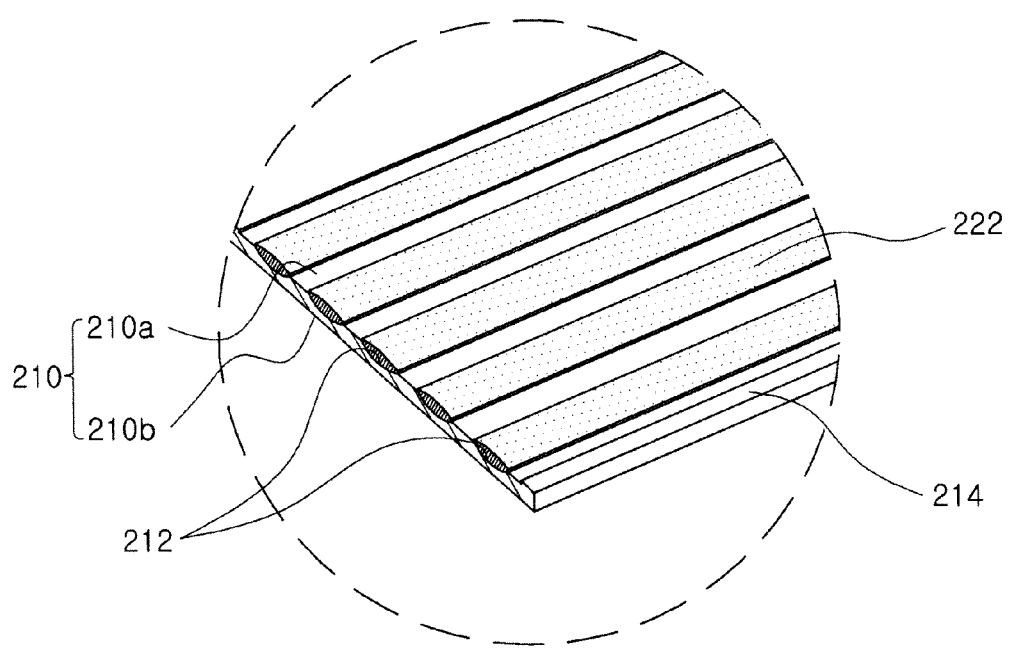
FIG. 5 is an enlarged perspective view showing part A of FIG. 3 according to a second exemplary embodiment of the present invention.
Figure 6:
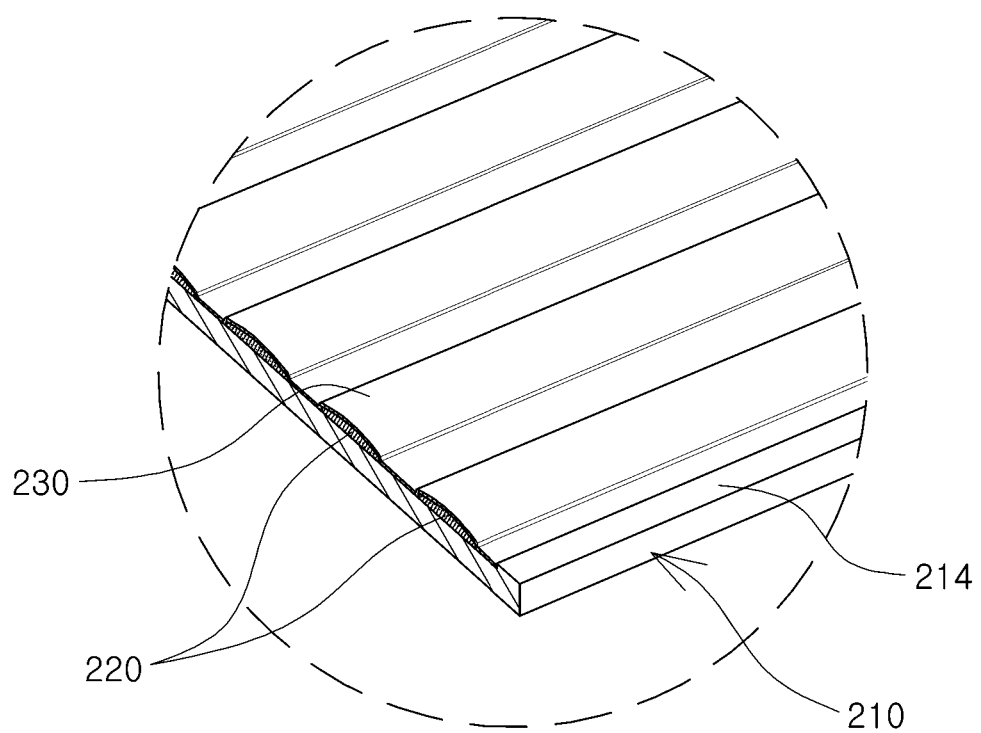
FIG. 6 is an enlarged perspective view showing part A of FIG. 3 according to a third exemplary embodiment of the present invention.
Figure 7A:
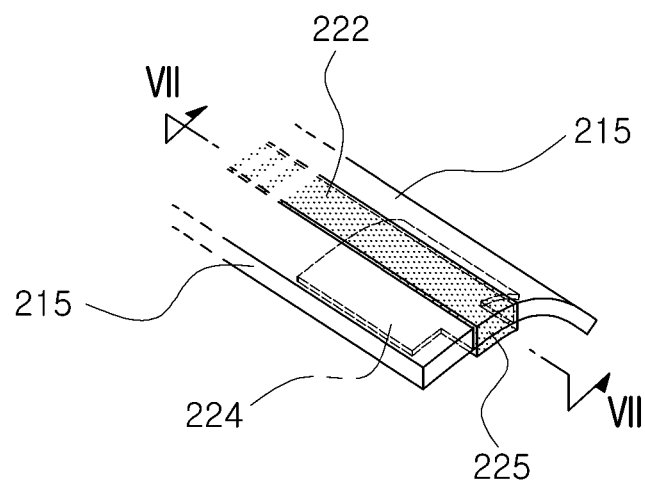
FIG. 7A is a partially enlarged perspective view of a connection terminal part frame of FIG. 3.
Figure 7B:
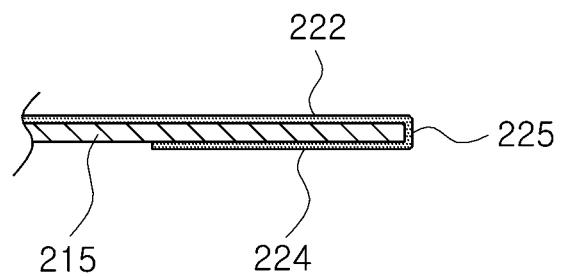
FIG. 7B is a cross-sectional view taken along the line VII-VII of FIG. 7A.

FIG. 3 is a schematic perspective view showing an antenna pattern frame according to a first exemplary embodiment of the present invention; FIG. 4 is an enlarged perspective view showing part A of FIG. 3 according to a first exemplary embodiment of the present invention; FIG. 5 is an enlarged perspective view showing part A of FIG. 3 according to a second exemplary embodiment of the present invention; FIG. 6 is an enlarged perspective view showing part A of FIG. 3 according to a third exemplary embodiment of the present invention; FIG. 7A is a partially enlarged perspective view of a connection terminal part frame of FIG. 3; and FIG. 7B is a cross-sectional view taken along line VII-VII of FIG. 7A; and FIGS. 8A through 8D are schematic perspective views showing operations for manufacturing an antenna pattern frame of FIG. 3 and a case of a mobile communications terminal using the antenna pattern frame.

Antenna Pattern Frame used for Manufacturing Case of Electronic Device Manufactured by Double Injection Molding According to First Exemplary Embodiment Referring to FIGS. 3 through 7B, an antenna pattern frame 200 according to a first exemplary embodiment may be provided with the radiator 220 including the antenna pattern part 222 formed by the coating and solidifying of a conductive material on one surface 210a of the radiator frame 210.

The radiator frame 210 may be a plastic plate formed by injection molding the polymer plastic injection molding liquid, and the plate may have the through hole 240 formed in a center thereof. In this configuration, the antenna pattern part 222 may include a loop antenna wound around the outer portion of the through hole 240.

The radiator 220 may include the connection terminal part 224 formed on a surface 210b opposite to one surface 210a of the radiator frame 210, and a connection part 225 connecting the antenna pattern part 222 to the connection terminal part 224.

The connection terminal part 224 is formed on a connection terminal part support 215 formed to protrude to an outer portion of the radiator frame 210, such that a distance between the connection terminal part 224 and the antenna pattern part 222 may be maintained to be within a predetermined range.

The connection part 225 is formed on a side surface of the radiator frame 210, such that the antenna pattern part 222 and the connection terminal part 224 may be disposed on different planes.

FIG. 4 is an enlarged cross-sectional view of part A of FIG. 3. Referring to FIG. 4, the antenna pattern part 222 is applied to and formed on one surface 210a of the flat radiator frame 210. FIG. 5 is an enlarged cross-sectional view of part A of FIG. 3 according to a partially modified exemplary embodiment. Referring to FIG. 5, a conductive material is applied to an intaglio position determining groove 212 formed on one surface 210a of the radiator frame 210 to form the antenna pattern part 222.

FIG. 6 is an enlarged cross-sectional view of part A of FIG. 3 according to another partially modified exemplary embodiment. Referring to FIG. 6, when the high temperature and high pressure injection molding liquid of the case frame 130 is filled on the antenna pattern part 222 after the antenna pattern part 222 made of the conductive material is solidified, an insulating protective layer 230 providing resistance to the high temperature and high pressure injection molding liquid may be formed.

In this configuration, an outer circumferential surface of the radiator frame 210 may be provided with an outer jaw 214 formed to be higher than an uppermost portion of the radiator 220. The outer jaw 214 may prevent the conductive material from flowing.

Method of Manufacturing Case of Electronic Device Having Antenna Pattern Embedded Therein and Mold Therefor A method of manufacturing an electronic device case having an antenna pattern embedded therein and a mold will be described with reference to FIGS. 8A through 8D.

First, a conductive ink is applied to the injection molded radiator frame 210 (FIG. 8A) and solidified to form the antenna pattern part 222 (FIG. 8B). The antenna pattern part may be formed on the radiator frame 210 by at least one of a sputtering method, a printing method, a plating method, a stamping method, a drawing method, and a dispensing method. FIG. 8B shows the antenna pattern part formed on the radiator frame 210 by an inkjet printing method using the conductive ink thereon.

The antenna pattern part 222 may be formed on the position determining groove 212 (FIG. 5) formed on the radiator frame 210, and the insulating protective layer 230 for protecting the antenna pattern part 222 from high temperature and high pressure injection molding conditions may be formed on the antenna pattern part 222.

In addition, the radiator frame 210 may be molded so that the through hole 240 is formed at a center of the antenna pattern part 222.

The outer circumferential surface of the radiator frame 210 manufactured as described above may be inserted into and seated in an inner side of a boundary part forming part formed at the mold 400 for the case of the electronic device as shown in FIG. 8C.

The boundary part forming part, which is the boundary jaw formed to protrude from the mold 400 for the case of the electronic device, may include an inner boundary jaw 444 having the through hole 240 of the radiator frame 210 inserted thereinto and an outer boundary jaw 442 having an outer circumferential portion of the radiator frame 210 inserted thereinto.

In addition, a resin material is introduced from an outer side of the boundary part forming part, passes through the boundary part forming part, is introduced from an upper surface of the radiator frame 210 and then fills an inner space 450 having a shape of the case frame 130 formed in the mold 400 for the case of the electronic device as shown in FIG. 8D.

The mold 400 for the case of the electronic device will be described with reference to FIGS. 8C and 8D.

The mold 400 for the case of the electronic device may include an upper mold 420 and a lower mold 440.

The radiator frame 210 may be in contact with and be supported by the upper mold 420 and the lower mold 440, the radiator frame 210 having the radiator 220 coated and solidified with the conductive material. A resin material inlet 460 may be formed in the upper mold, the lower mold, or the upper and lower molds 420 and 440 so that the case frame shaped inner space 450 formed by combining the upper and lower molds 420 and 440 becomes the case frame 130.

Here, at least one of the upper and lower molds 420 and 440 may be provided with the boundary part forming part into which the radiator frame 210 is inserted.

The boundary part forming part may be a protrusion protruding from the upper mold or the lower mold so that an outer circumferential portion defining an outer boundary of the radiator frame 210 and an inner circumferential portion of the through hole 240 formed in the radiator frame 210 are inserted thereinto. The protrusion may include the outer boundary jaw 442 and the inner boundary jaw 444.

Here, the boundary part forming part may have an increasing inclination in a direction in which the resin material moves in the inner space 450, and may have an inclination through which the introduced resin material first may first contact the upper surface of the radiator frame 210.

That is, the height of the boundary part forming part may be reduced in a direction from a boundary part of the radiator frame 210 toward the inner space thereof.

Here, it should be noted that when the antenna pattern part 222 made of the conductive material formed on the surface of the radiator frame 210 is pushed or peeled off during the injection molding, antenna characteristics may change. Therefore, caution is required therewith.

The resin material inlet 460 may be disposed away from the antenna pattern part 222 in the range that does not cause a defect in the injection molding at an outer portion of the boundary part forming part.

Figure 9:
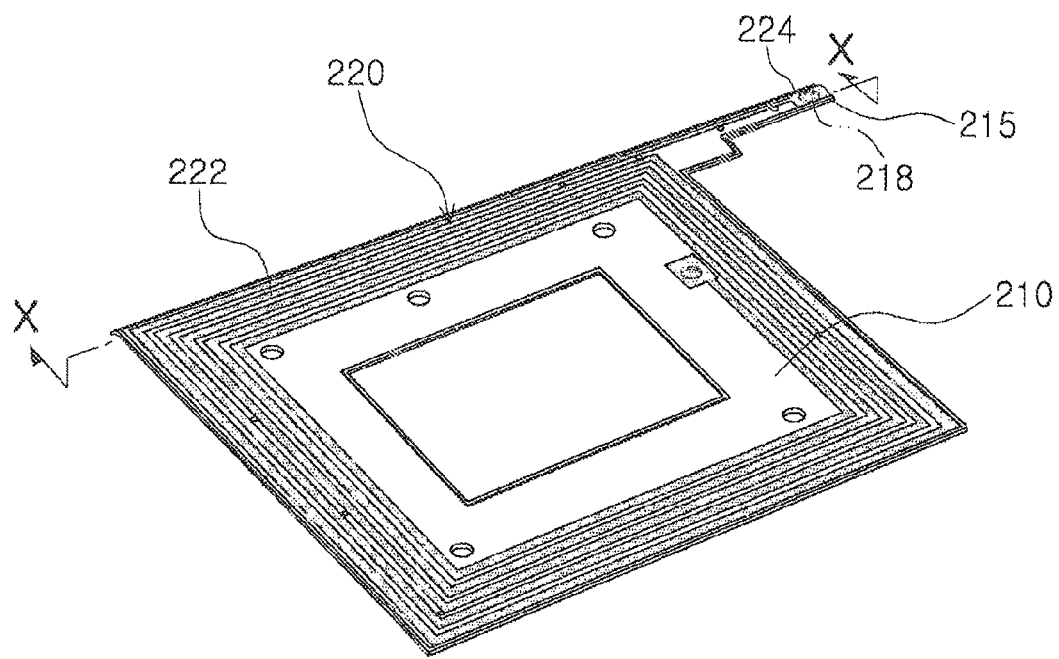
FIG. 9 is a schematic perspective view showing an antenna pattern frame according to a second exemplary embodiment of the present invention.
Figure 10:
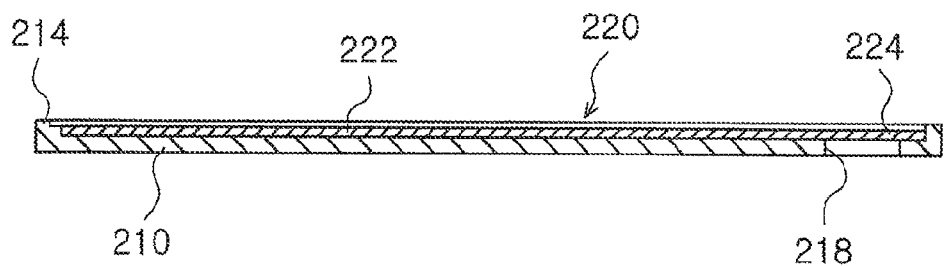
FIG. 10 is a cross-sectional view taken along line X-X of FIG. 9.
Figure 11A:
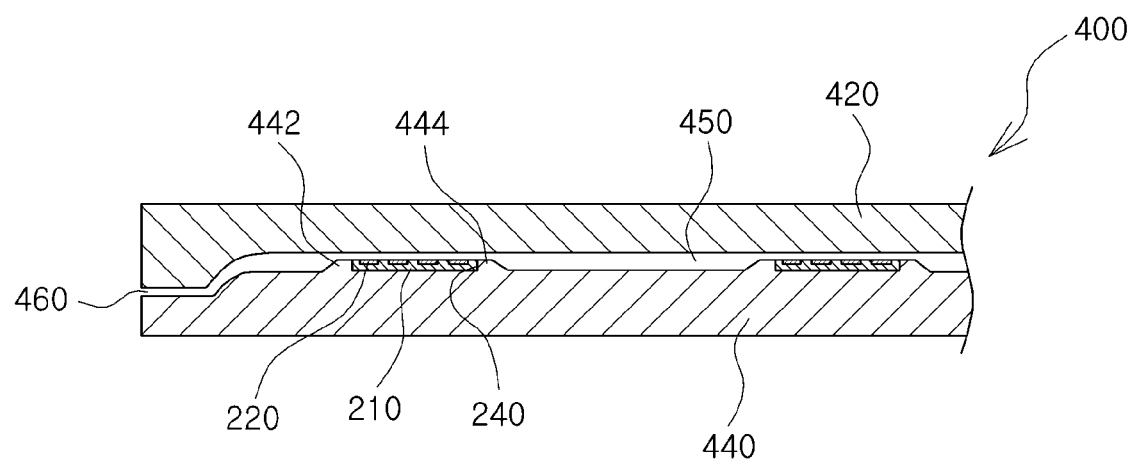
FIGS. 11A and 11B are views showing operations for manufacturing a case of a mobile communications terminal using the antenna pattern frame of FIG. 9.
Figure 11B:
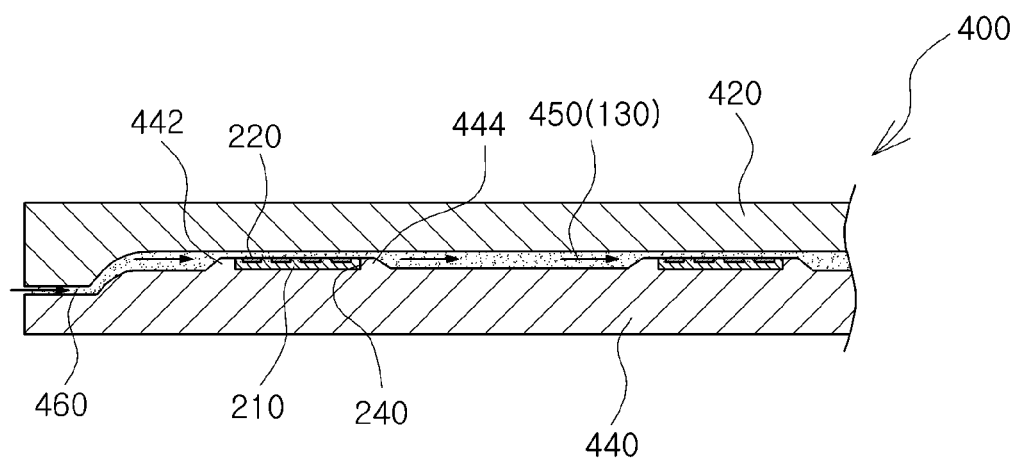

FIG. 9 is a schematic perspective view showing an antenna pattern frame according to a second exemplary embodiment of the present invention; FIG. 10 is a cross-sectional view taken along line X-X of FIG. 9; and FIGS. 11A and 11B are views showing operations for manufacturing a case of a mobile communications terminal using the antenna pattern frame of FIG. 9.

Antenna Pattern Frame Used for Manufacturing Case of Electronic Device Manufactured by Double Injection Molding According to Second Exemplary Embodiment An antenna pattern frame used for manufacturing an electronic device case by double injection molding according to a second exemplary embodiment will be described with reference to FIGS. 9 through 11. In the present embodiment, only content different from that of the antenna pattern frame according to the first exemplary embodiment will be described, and content other than the content described below is referred to the content described in the antenna pattern frame according to the first exemplary embodiment.

The antenna pattern frame 200 according to the present embodiment may include the radiator frame 210 injection molded so that the radiator 220 including the antenna pattern part 222 formed of a metal sheet is exposed on one surface 210*a* thereof, rather than injection molding the radiator frame 210 using the polymer plastic and then coating thereon with the conductive material.

The radiator 220 may include the antenna pattern part 222 formed by press processing the metal sheet.

In addition, the radiator 220 may include the connection terminal part 224 formed on one surface 210*a* of the radiator frame 210, and the connection terminal part 224 may be embedded in and exposed from the connection terminal part support 215 formed to protrude to the outer portion of the radiator frame 210.

In this configuration, a lower portion of the connection terminal part 224 formed at the connection terminal part support 215 may be provided with an interconnection hole 218 into which a connection pin 148 of the printed circuit board 140 (FIG. 2) of the electronic device is inserted.

The antenna pattern frame 200 as described above may be inserted into a boundary part forming part formed in an inner portion of a mold 400 substantially the same as the mold 400 for manufacturing the case of the electronic device using the antenna pattern frame according to the first exemplary embodiment of the present invention.

In addition, the case 120 of the electronic device may be manufactured by introducing an injection molding liquid into the inner space 450 of the mold 400 for the electronic device case.

The boundary part forming part may prevent the antenna pattern frame from being moved within the mold 400 for the electronic device case.

Figure 12:
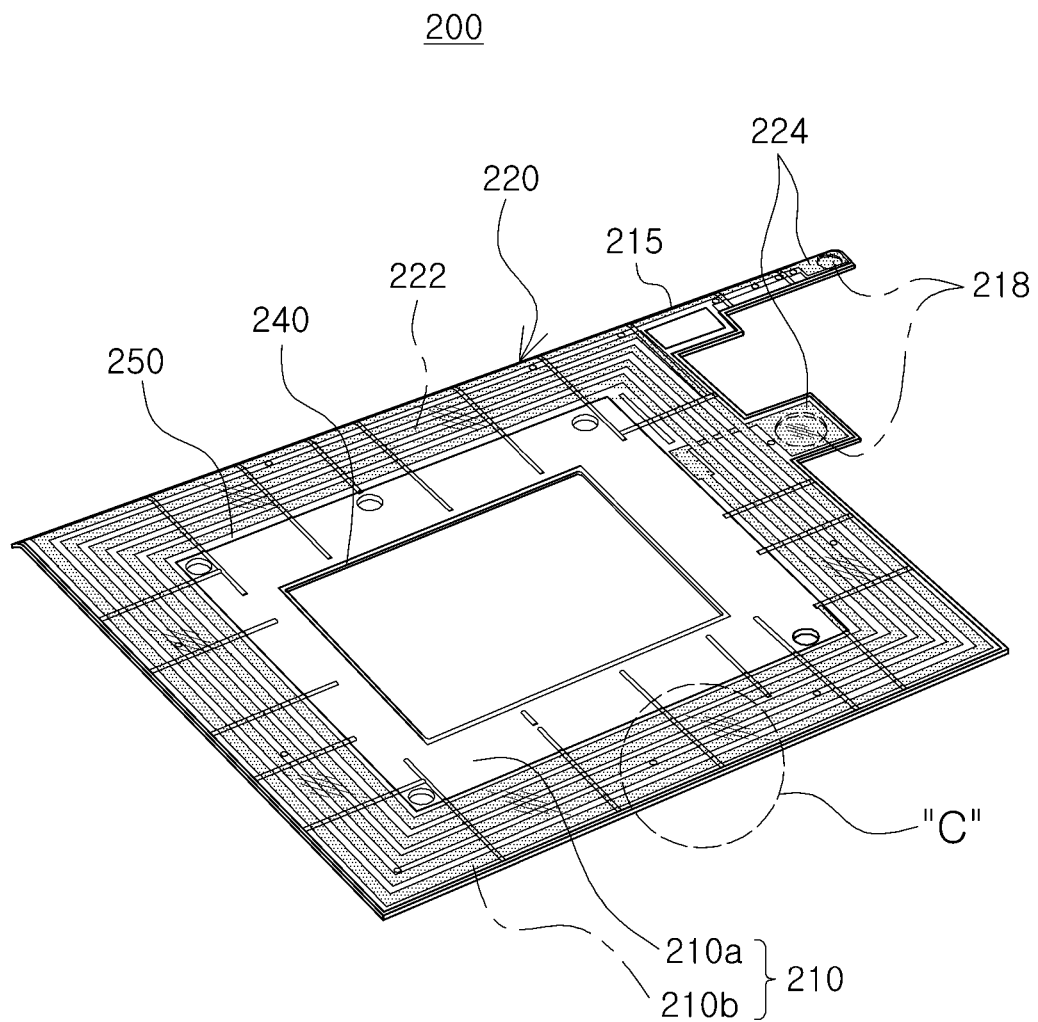
FIG. 12 is a schematic perspective view showing an antenna pattern frame according to a third exemplary embodiment of the present invention.
Figure 13A:
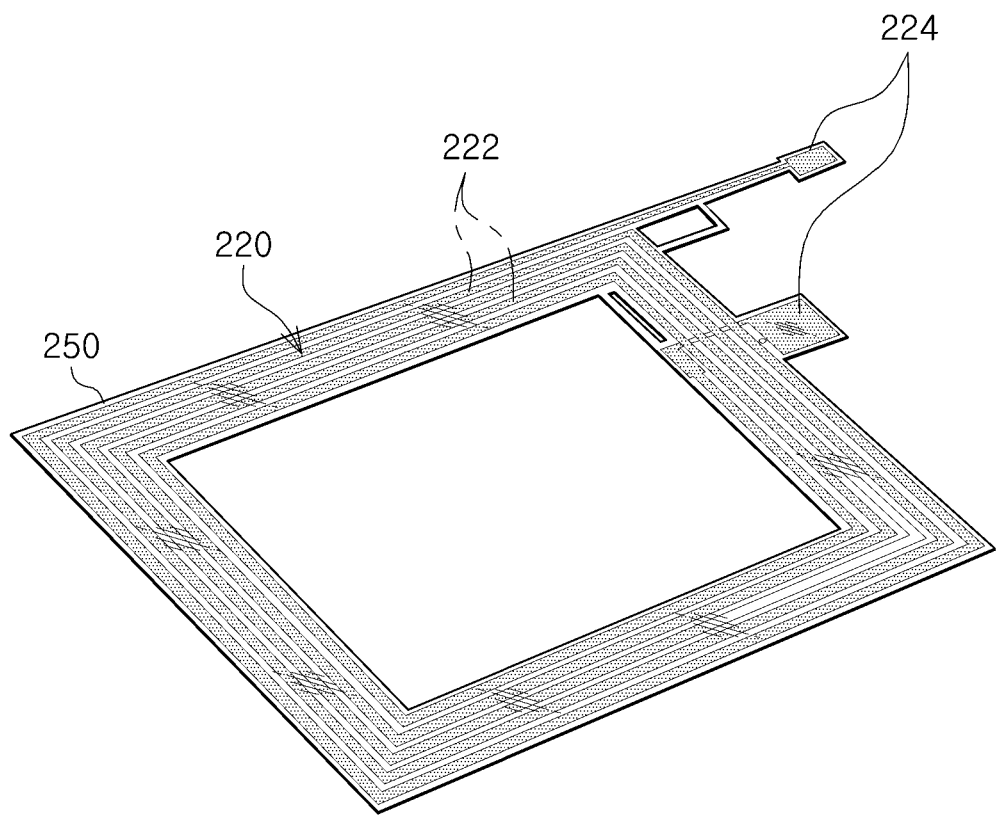
FIGS. 13A through 13D are views showing operations for manufacturing the antenna pattern frame of FIG. 12.
Figure 13B:
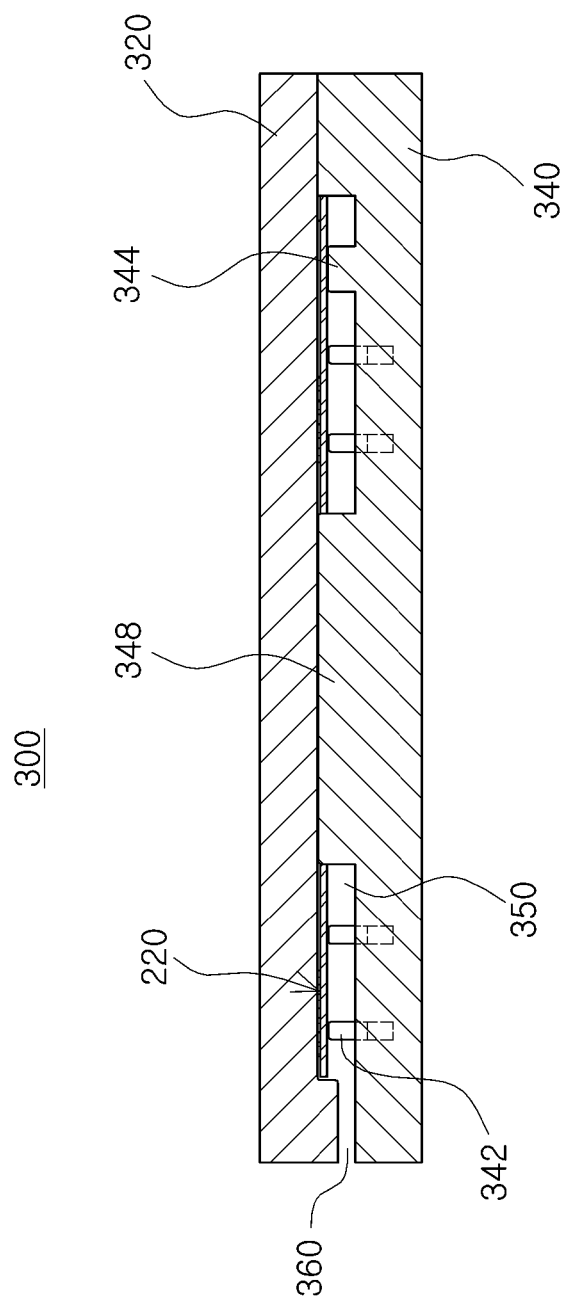
Figure 13C:
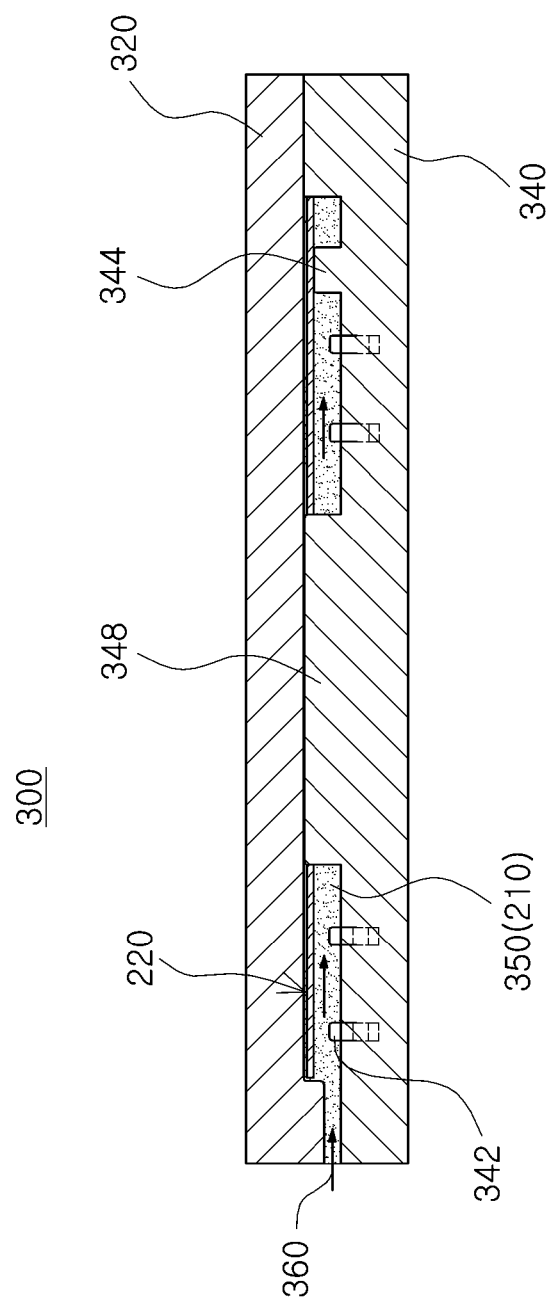
Figure 13D:
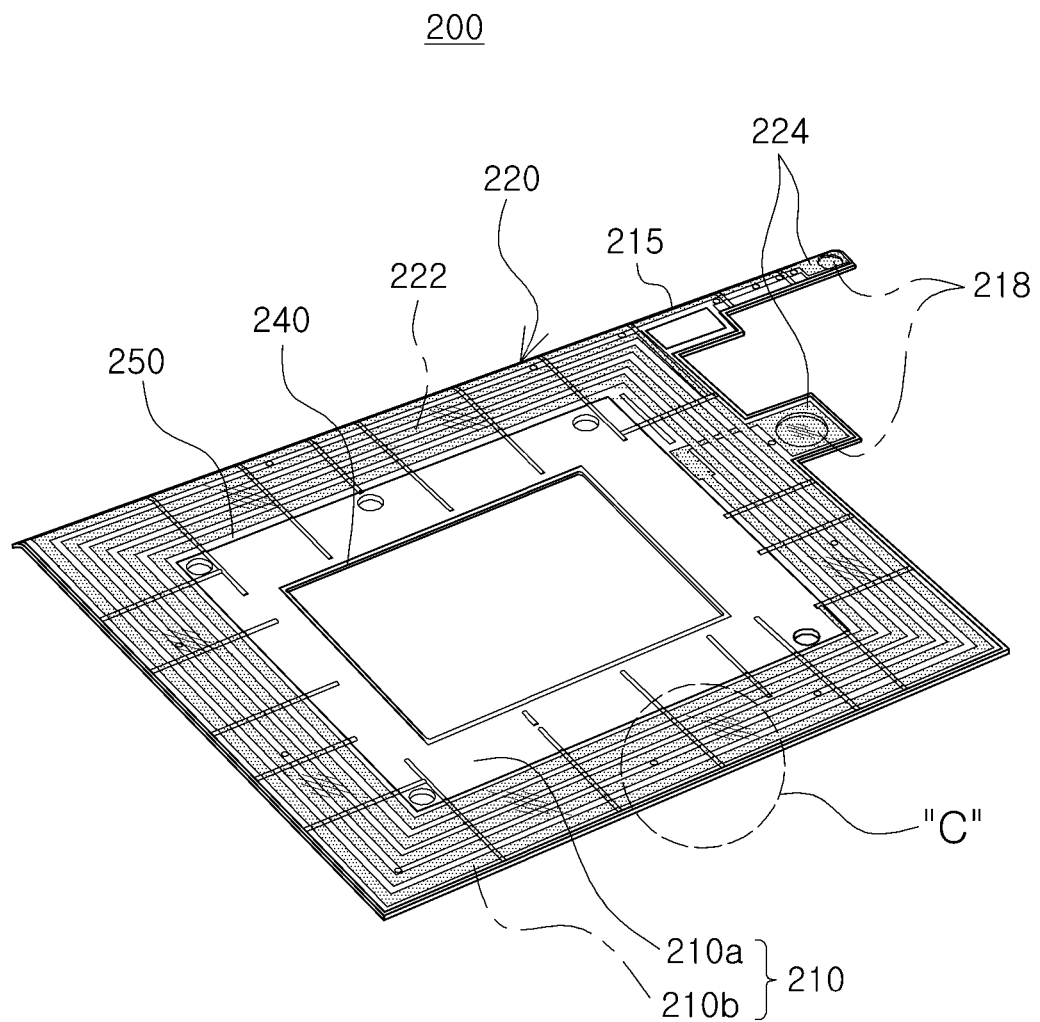
Figure 14A:
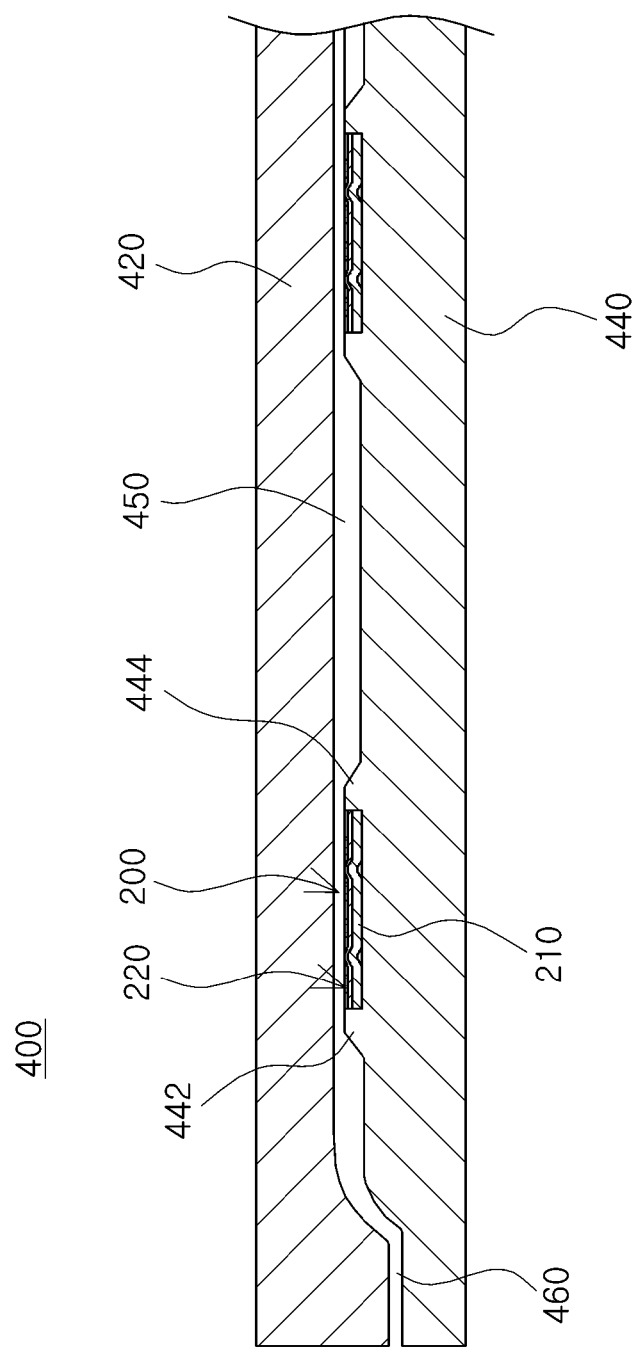
FIGS. 14A and 14B are views showing operations for manufacturing a case of a mobile communications terminal using the antenna pattern frame of FIG. 12.
Figure 14B:
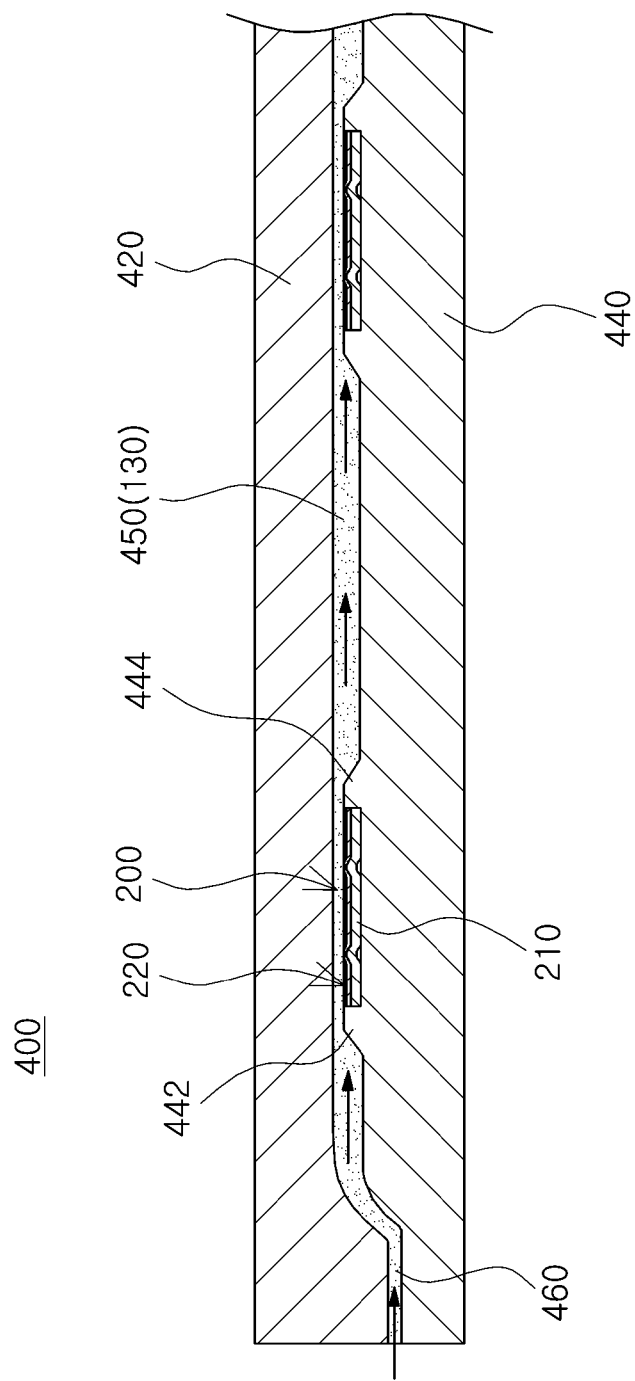
Figure 15:
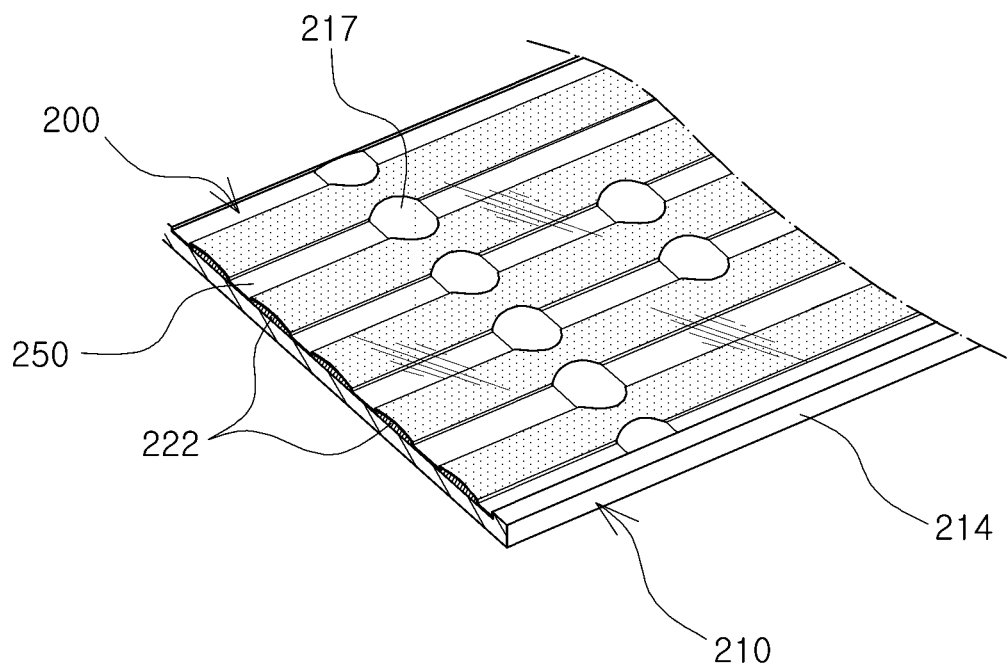
FIG. 15 is an enlarged perspective view showing part C of FIG. 12 according to a first exemplary embodiment of the present invention.
Figure 16:
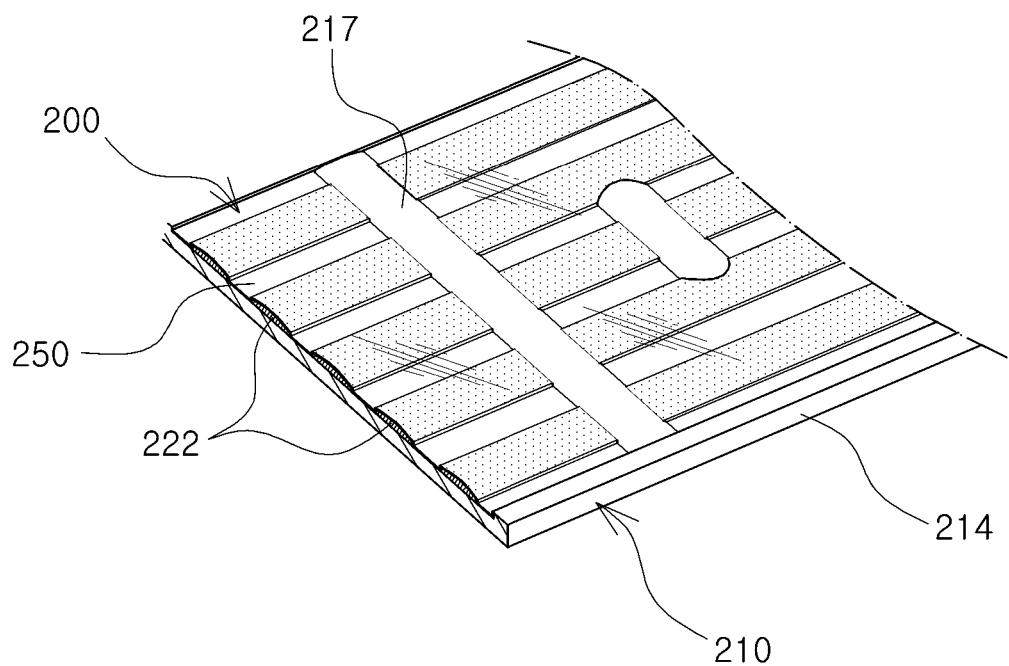
FIG. 16 is an enlarged perspective view showing part C of FIG. 12 according to a second exemplary embodiment of the present invention.

FIG. 12 is a schematic perspective view showing an antenna pattern frame according to a third exemplary embodiment of the present invention; FIGS. 13A through 13D are views showing operations for manufacturing the antenna pattern frame of FIG. 12; FIGS. 14A and 14B are views showing operations for manufacturing a case of a mobile communications terminal using the antenna pattern frame of FIG. 12; FIG. 15 is an enlarged perspective view showing part C of FIG. 12 according to a first exemplary embodiment of the present invention; and FIG. 16 is an enlarged perspective view showing part C of FIG. 12 according to a second exemplary embodiment of the present invention.

Figure 17:
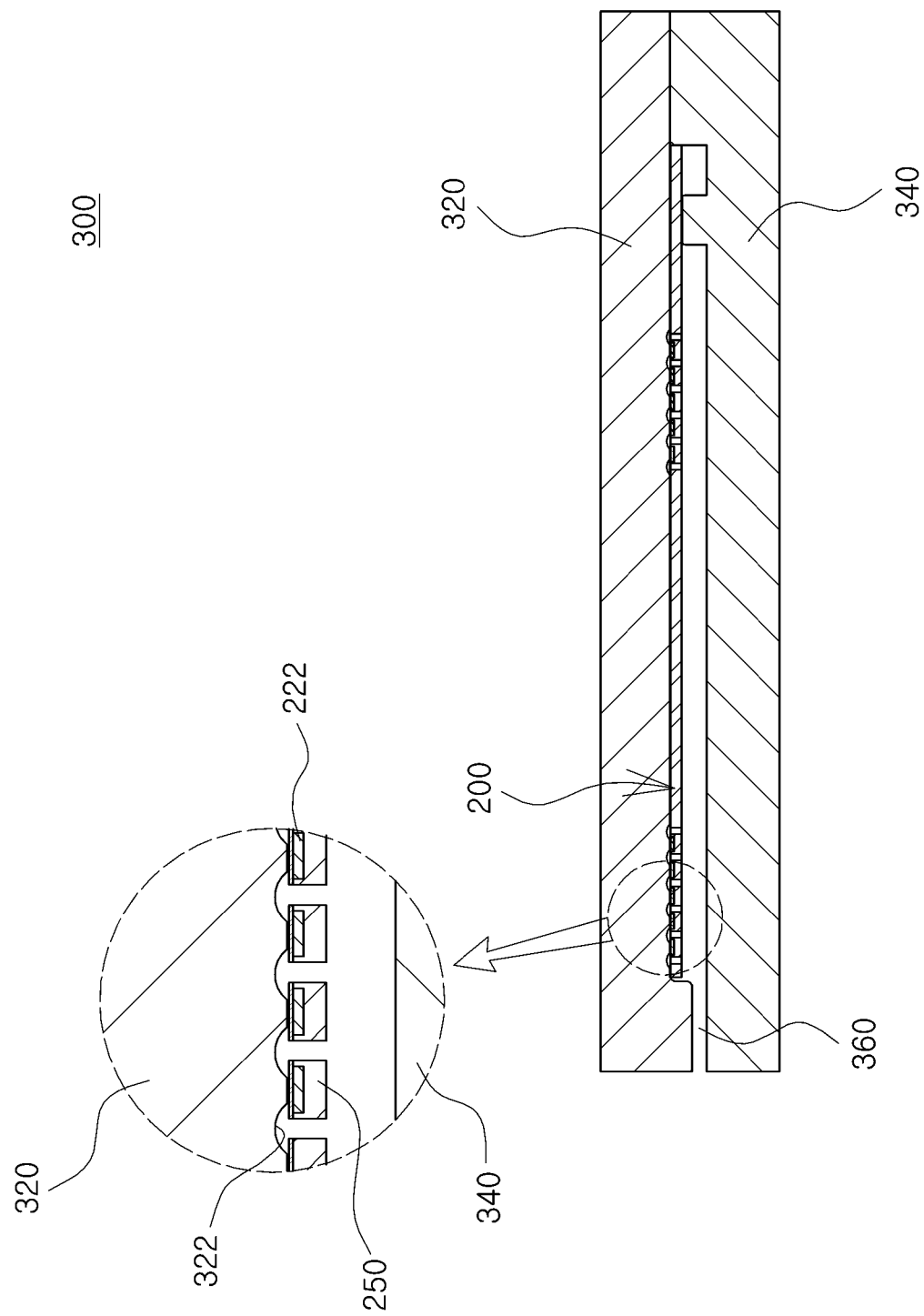
FIG. 17 is a cross-sectional view showing a mold for manufacturing the antenna pattern frame of FIG. 15.
Figure 18:
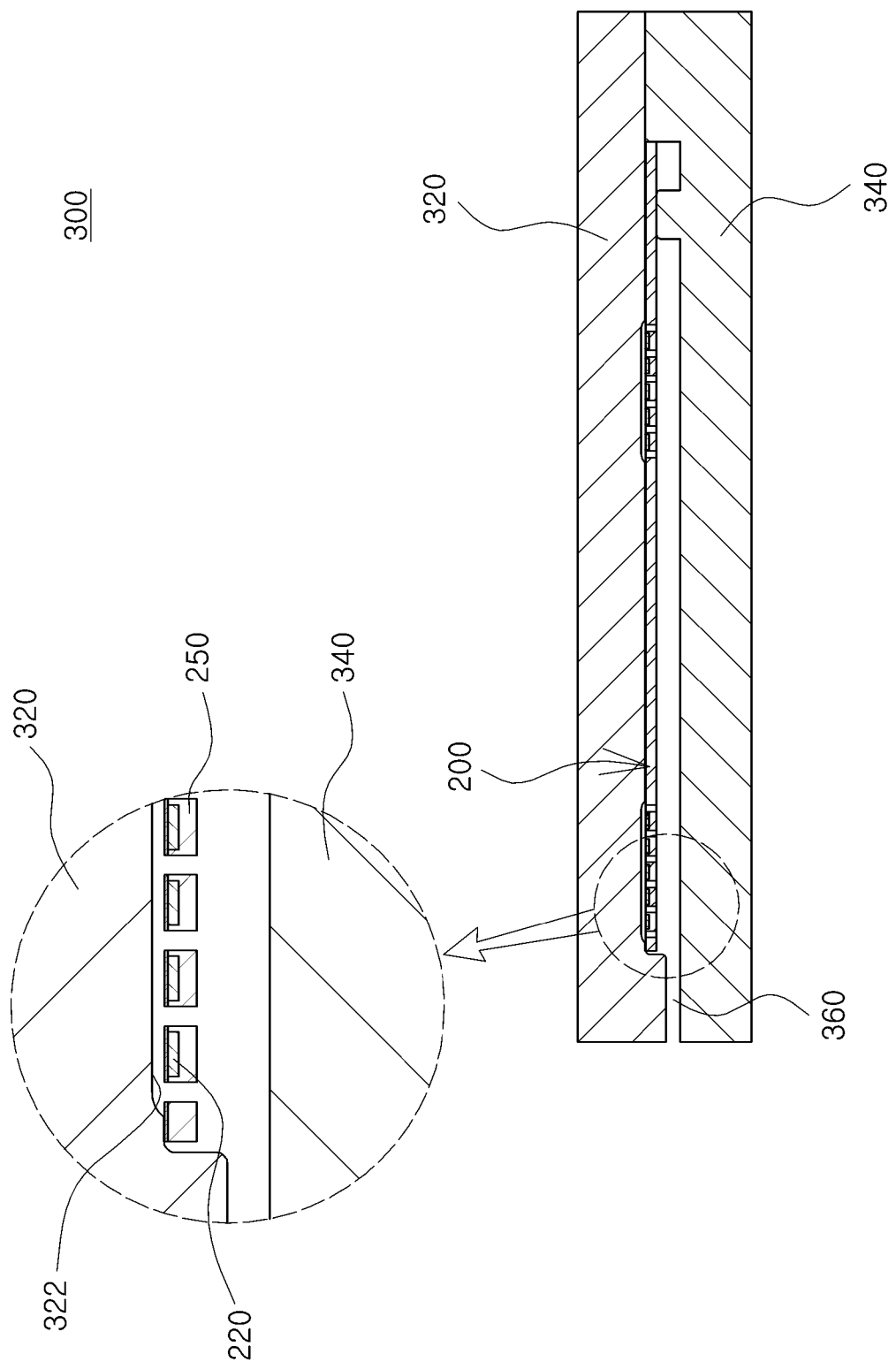
FIG. 18 is a cross-sectional view showing a mold for manufacturing the antenna pattern frame of FIG. 16.
Figure 19:
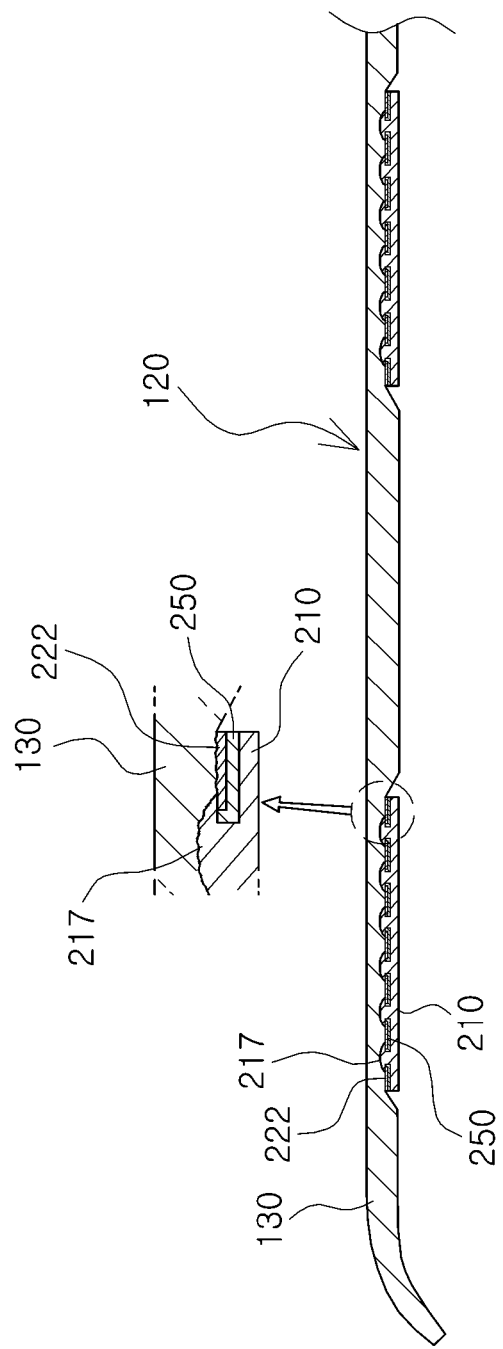
FIG. 19 is a cross-sectional view of a case of a mobile communications terminal manufactured using the antenna pattern frame of FIG. 15.

In addition, FIG. 17 is a cross-sectional view schematically showing a mold for manufacturing the antenna pattern frame of FIG. 15; FIG. 18 is a cross-sectional view schematically showing a mold for manufacturing the antenna pattern frame of FIG. 16; and FIG. 19 is a cross-sectional view of a case of a mobile communications terminal manufactured using the antenna pattern frame of FIG. 15.

Antenna Pattern Frame Used for Manufacturing Case of Electronic Device Manufactured by Double Injection Molding According to Third Exemplary Embodiment and Antenna Pattern Frame for Transferring Low Frequency Signal An antenna pattern frame used for manufacturing an electronic device case manufactured by double injection molding according to a third exemplary embodiment will be described with reference to FIGS. 12 through 19. In the present embodiment, only features different from those of the antenna pattern frame according to the first exemplary embodiment will be described, and content other than the content described below is referred to the content described in the antenna pattern frame according to the first exemplary embodiment.

The antenna pattern frame 200 according to the present embodiment may include the radiator frame 210 injection molded so that the radiator 220 including the antenna pattern part 222 and formed on a film 250 is formed on one surface 210*a* thereof.

The antenna pattern is formed on the film 250, whereby a thin and elongate antenna pattern may be easily implemented, as compared to a case of using the metal sheet.

The radiator frame 210 may include the through hole 240, and the antenna pattern part 222 may include the loop antenna wound around the outer portion of the through hole 240.

In addition, the antenna pattern part 222 may include an antenna coil wound multiple times so that the low frequency signal may be transmitted or received. The antenna pattern part 222 may include the antenna coil, whereby a small electronic apparatus such as the mobile communications terminal may also transmit or receive a broadcasting frequency in a low frequency band without a separate exterior antenna and may perform RFID communication. In addition, the low frequency antenna pattern part may also be used as a wireless charging type antenna pattern.

The case of the electronic device having the above-mentioned low frequency antenna pattern embedded therein may also be manufactured by double injection molding.

The radiator 220 including the low frequency antenna pattern part may be formed of a thin and elongate antenna pattern, and may be formed by coating the conductive material on the film 250. When the metal pattern is formed to be thin and elongate, this metal pattern may also be used as the low frequency antenna pattern part.

The radiator frame 210 may be injection molded using a polymer mixture containing a magnetic substance component so that the radiator 220 including the low frequency antenna pattern part 222 is formed on one surface 210*a* thereof.

A capacitive component is generated around the radiator 220 by changing the permittivity of the material of the radiator frame 210 as a base on which the radiator 220 is mounted, such that a length of the antenna pattern may be reduced. When the length of the antenna pattern is reduced as described above, a size of the radiator frame 210 may be reduced.

The radiator frame 210 of the low frequency antenna pattern part 222 also may have the through hole 240, and the antenna pattern part 222 may include the antenna coil wound multiple times around the outer portion of the through hole 240.

The polymer mixture containing the magnetic substance component includes a magnetic substance component having high permeability such as ferrite, whereby performance of the low frequency band antenna may be improved and noise, electromagnetic wave, and the like, generated during operation of an set apparatus may be efficiently shielded.

The radiator frame 210 including the above-mentioned low frequency antenna pattern part 222 formed on one surface 210a thereof and made of the polymer mixture containing the magnetic substance component is seated in the mold 400 for the case of the electronic device, and the injection molding liquid is introduced thereinto, whereby the low frequency antenna pattern part 222 may be embedded between the radiator frame 210 and the case frame 130.

The case frame 130 may be formed by injection molding an injection molding liquid of at least one selected from a polycarbonate (PC), an acrylonitrile-butadiene-styrene (ABS), a resin and a polymer plastic.

Meanwhile, a film type antenna pattern frame 200 according to the present embodiment may be manufactured by inserting the film 250 having the antenna pattern part 222 formed thereon through a manufacturing process of FIGS. 13A through 13D into a mold 300 of the antenna pattern frame.

The film 250 having the antenna pattern part 222 formed thereon may be adhered to an upper mold 320 of the mold 300 of the antenna pattern frame or may be supported by and fixed to a moving pin 342, or the like.

In this configuration, a lower mold 340 may be provided with the moving pin 342, a through hole forming part 348 having a shape corresponding to the through hole 240 of the radiator frame 210, an interconnection hole forming part 344, or the like.

The resin is filled in an inner space 350 having the shape of the radiator frame 210 formed by combining the upper mold 320 and the lower mold 340, whereby the radiator frame 210 to which the film 250 having the antenna pattern part 222 formed thereon is injection molded and fixed may be formed.

The film 250 may be made of a polymer plastic material containing a Cu component. The polymer plastic material may be of a polycarbonate (PC), a polyethylene terephthalate (PET), an acrylonitrile-butadiene-styrene (ABS), a mixture thereof, and the like.

A process for forming the antenna pattern part 222 on the film 250 may use not only a method of pressing and adhering a metal sheet but also a sputtering method, a printing method, a plating method, a stamping method, a drawing method, a dispensing method, and the like, on the film 250.

Particularly, in order to employ the antenna used for the low frequency band or RFID communication, a method of applying the conductive material rather than pressing and adhering the metal sheet may be used for forming the thin and elongate antenna pattern.

The above-mentioned antenna pattern frame 200 is inserted into the mold 400 for the case of the electronic device as shown in FIG. 14A, and the resin material is introduced thereinto as shown in FIG. 14B, whereby, the case 120 of the electronic device may be formed. A description of the mold and the method of manufacturing the case of the electronic device may be replaced with the description in FIGS. 8C and 8D.

FIGS. 15 and 16 show a modified example of part C of the antenna pattern frame 200 of FIG. 12.

Referring to FIG. 15, the radiator frame 210 may include an over-mold part 217 formed to cover a portion of each of adjacent antenna pattern parts 222. Referring to FIG. 16, the radiator frame 210 may include an over-mold part 217 formed to cover all antenna pattern parts 222 adjacent thereto.

The over-mold part 217 serves to prevent the antenna pattern part 222 from being loose on the radiator frame 210 and firmly fix the antenna pattern part 222 to the radiator frame 210.

The mold 300 of the antenna pattern frame of FIGS. 17 and 18 may be used to manufacture the antenna pattern frame 200 of FIGS. 15 and 16.

The upper mold 320 of the mold 300 of the antenna pattern frame has an over-mold part forming groove 322 formed therein, wherein the upper mold 320 contacts the film 250 including the antenna pattern part 222.

FIG. 19 is a cross-sectional view of the case 120 of the electronic device including the case frame 130 manufactured by double injection molding the antenna pattern frame 200 including the over-mold part 217.

As a resin material used during secondary injection molding, a resin material having a temperature at which surfaces of the over-mold part 217 and the radiator frame 210 may be melted may be used.

As a result, as shown in FIG. 19, a contact part between the case frame 130 and the radiator frame 210 is melted, such that a surface thereof becomes rough, allowing an adhesion force between the case frame 130 and the radiator frame 210 to be stronger.

Figure 20:
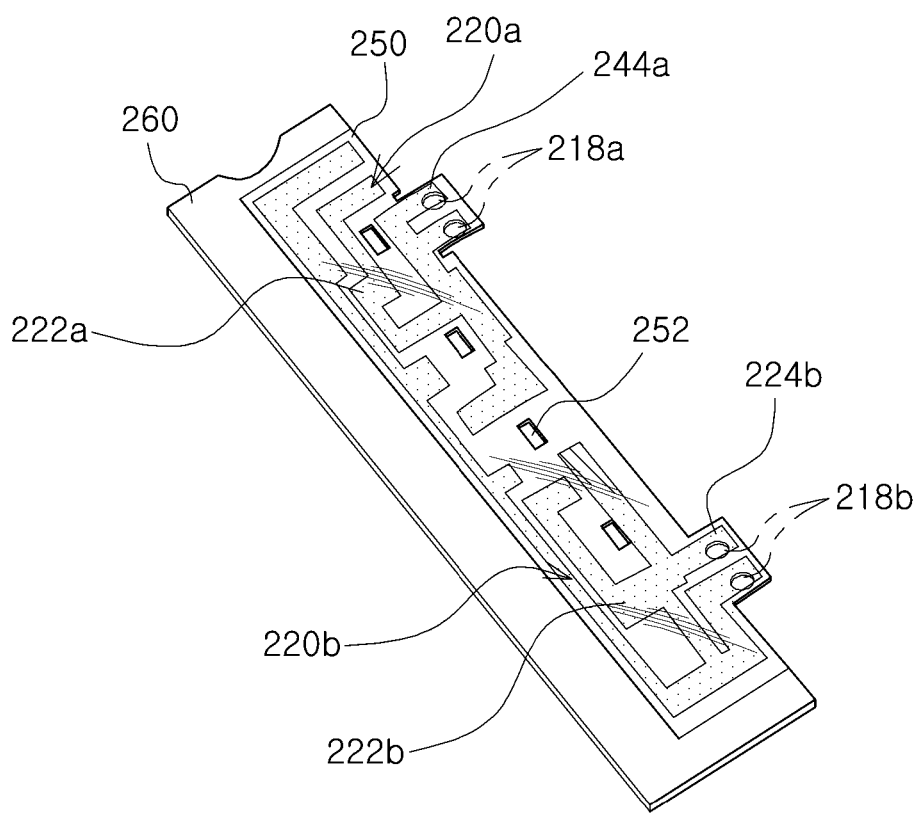
FIG. 20 is a schematic perspective view showing an antenna pattern frame according to a fourth exemplary embodiment of the present invention.

FIG. 20 is a schematic perspective view showing an antenna pattern frame according to a fourth exemplary embodiment of the present invention; FIGS. 21A through 21D are views showing operations of manufacturing the antenna pattern frame of FIG. 19; and FIGS. 22A and 22B are views showing operations for manufacturing a case of a mobile communications terminal using the antenna pattern frame of FIG. 20.

Figure 21A:
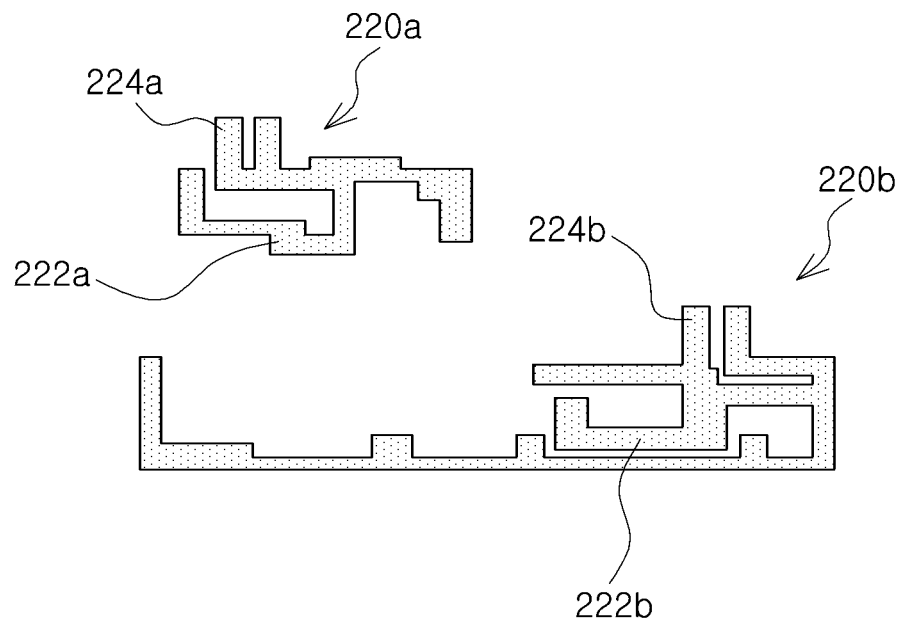
FIGS. 21A through 21D are views showing operations for manufacturing the antenna pattern frame of FIG. 19.

Antenna Pattern Frame Used for Manufacturing Case of Electronic Device Manufactured by Double Injection Molding According to Fourth Exemplary Embodiment An antenna pattern frame 200 according to the present embodiment is the same in a basic idea as the antenna pattern frame 200 according to the third exemplary embodiment in that the antenna pattern part 222 is fixed using the film 250. However, the antenna pattern frame 200 according to the present embodiment has a difficulty in being used as an antenna for low frequency communication in that a plurality of radiators 220a and 220b formed by pressing the metal sheet are fixed onto the film as shown in FIG. 21A.

Figure 21B:
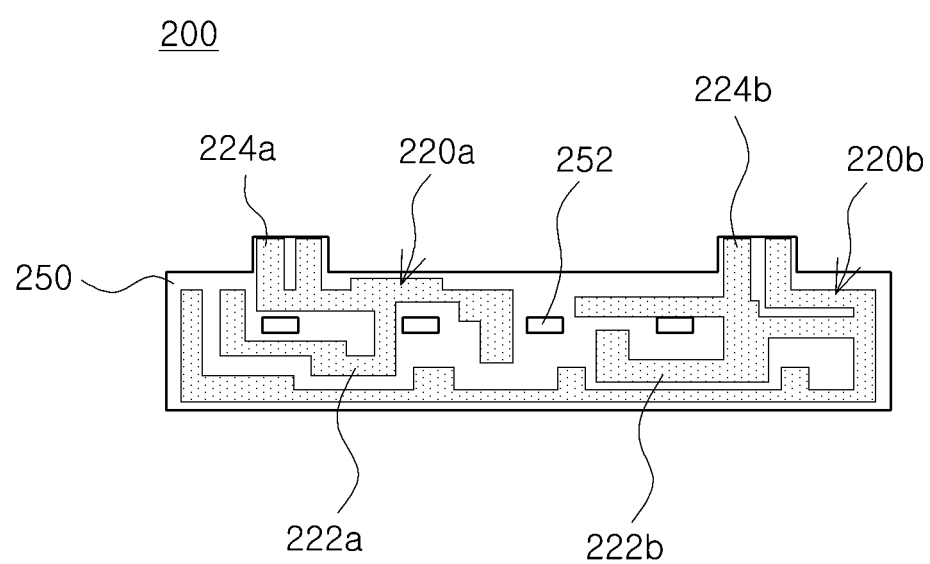
Figure 21C:
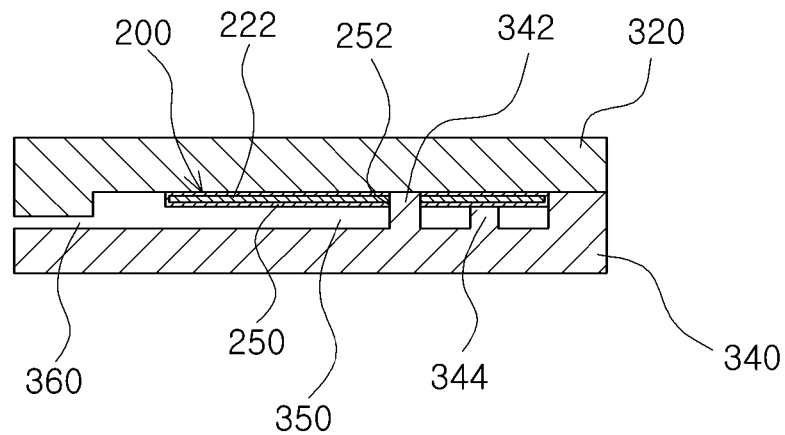
Figure 21D:
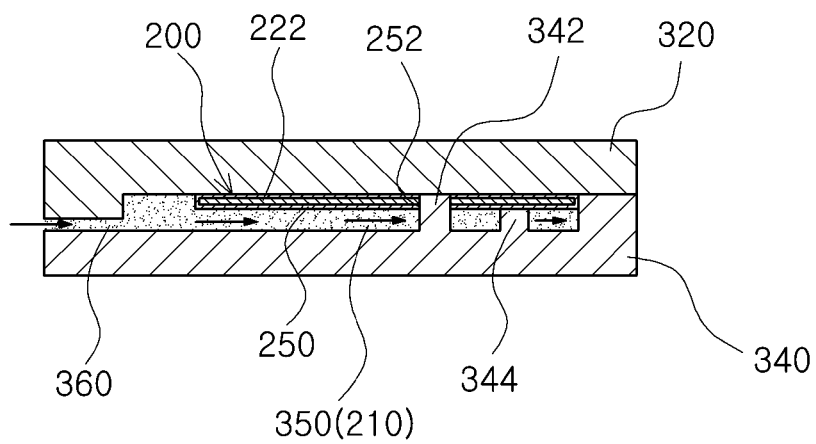

The plurality of radiators 220a and 220b are fixed onto the film 250 by a method such as an adhesion method, or the like as shown in FIG. 21B. Here, the film 250 has pin holes 252 formed therein, and the pin hole 252 may be inserted and fixed into a contact pin 346, or the like, formed in the mold 300 of the antenna pattern frame to thereby prevent the antenna pattern frame 200 from being moved during the introduction of the injection molding liquid.

Figure 22A:
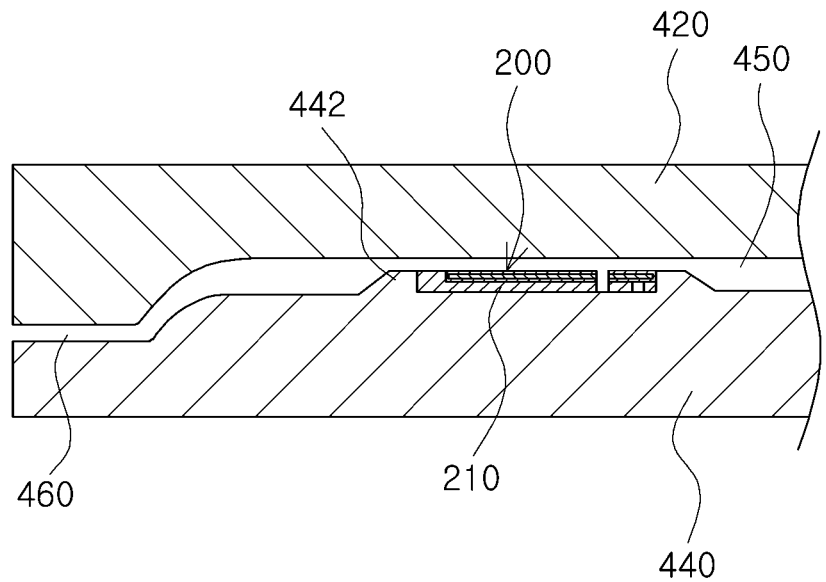
FIGS. 22A and 22B are views showing operations for manufacturing a case of a mobile communications terminal using the antenna pattern frame of FIG. 20.
Figure 22B:
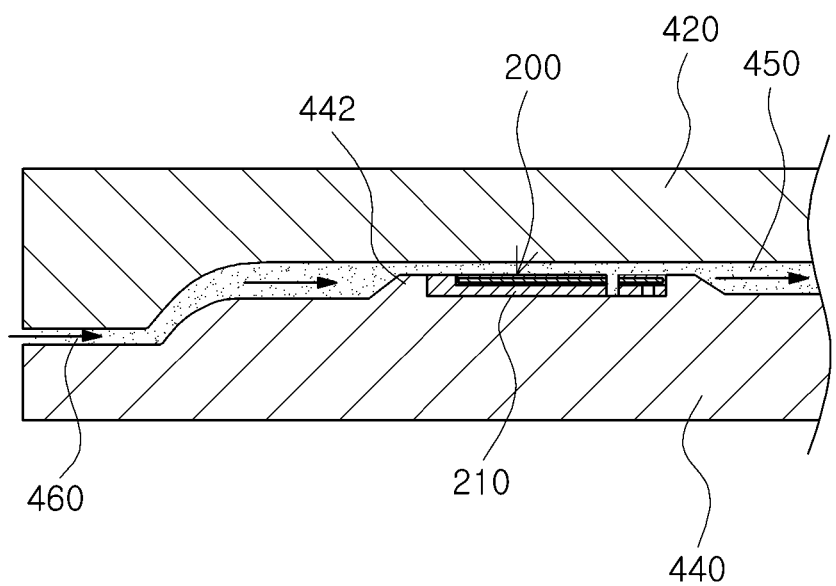

The antenna pattern frame 200 manufactured as described above is the same as the antenna pattern frame described in FIGS. 8C and 8D in that the antenna pattern frame 200 inserted into the boundary part forming part 442 of the mold 400 for the case of the electronic device and is injection molded as shown in FIGS. 22A and 22B.

Figure 23:
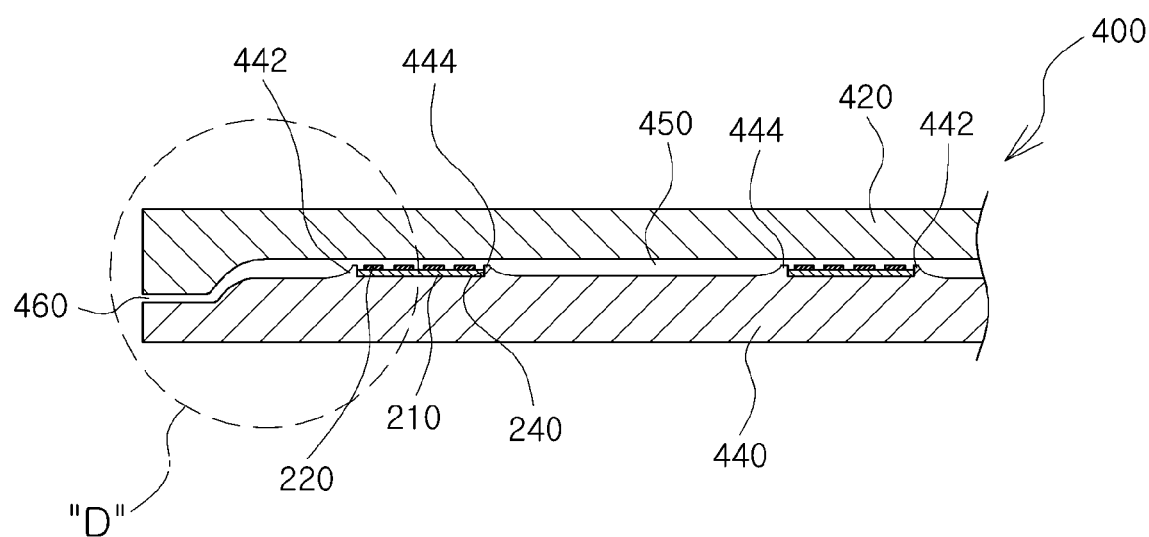
FIG. 23 is a cross-sectional view showing a modified example of a mold of a case of a mobile communications terminal according to an exemplary embodiment of the present invention.
Figure 24:
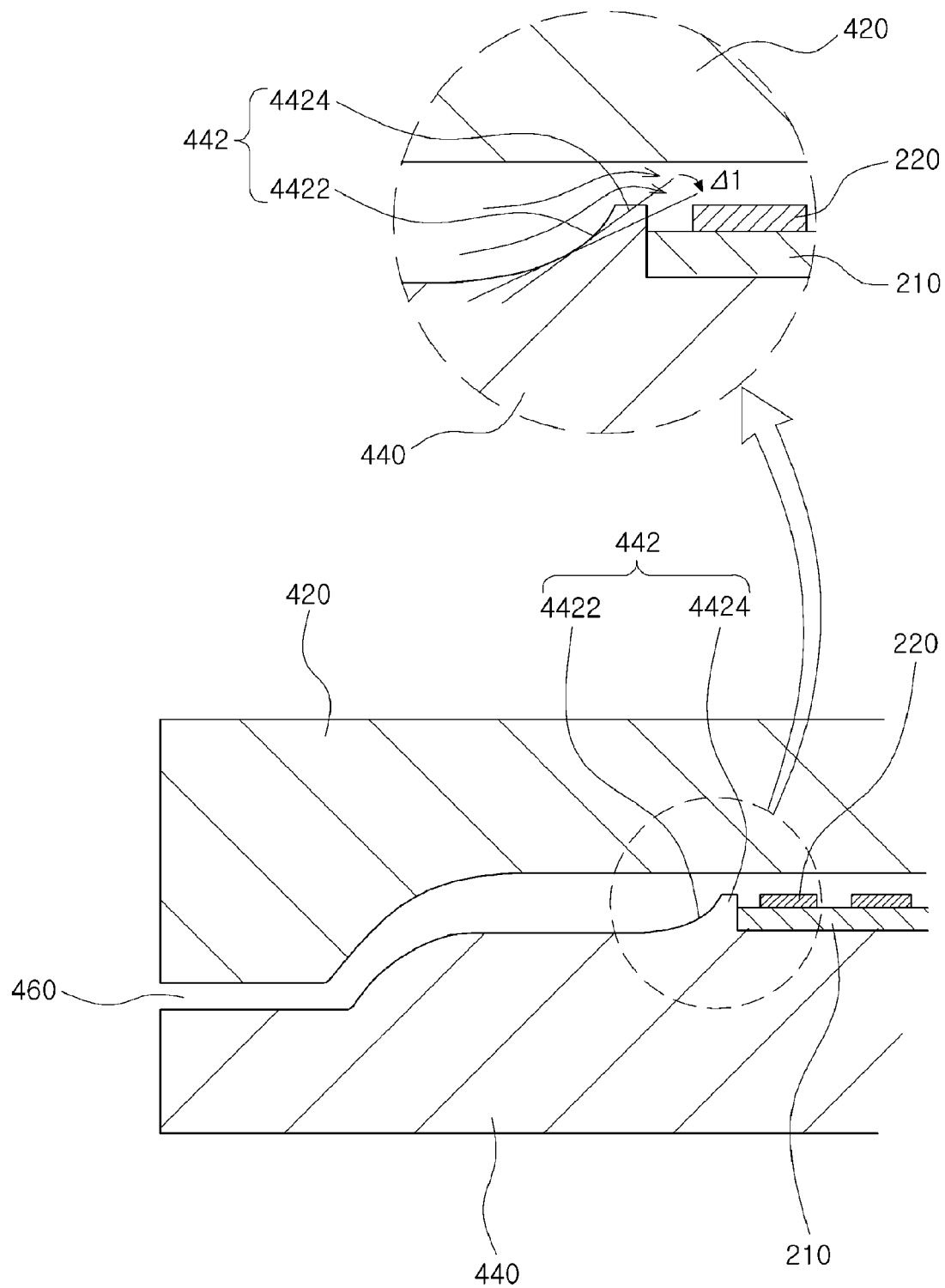
FIG. 24 is an enlarged cross-sectional view showing part D of FIG. 23.
Figure 25:
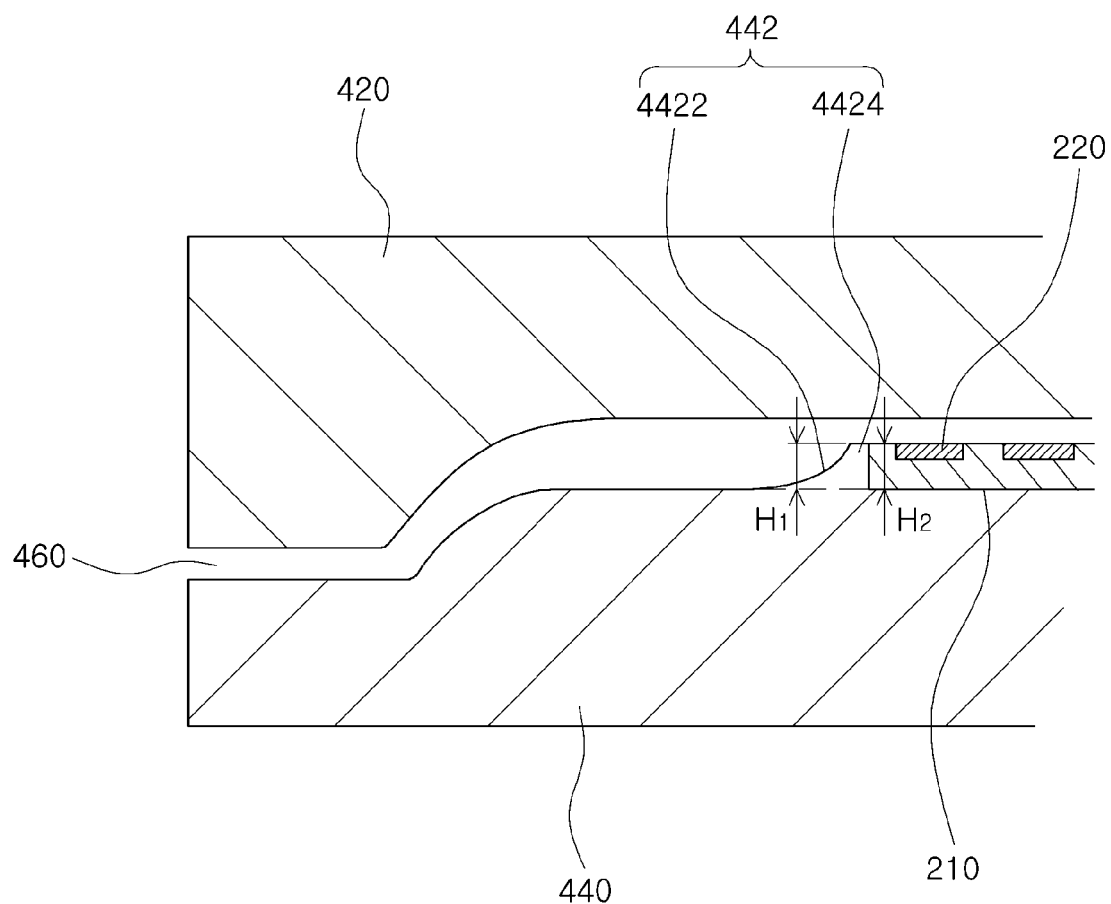
FIG. 25 is a cross-sectional view showing a first modified example of part D of FIG. 23.
Figure 26:
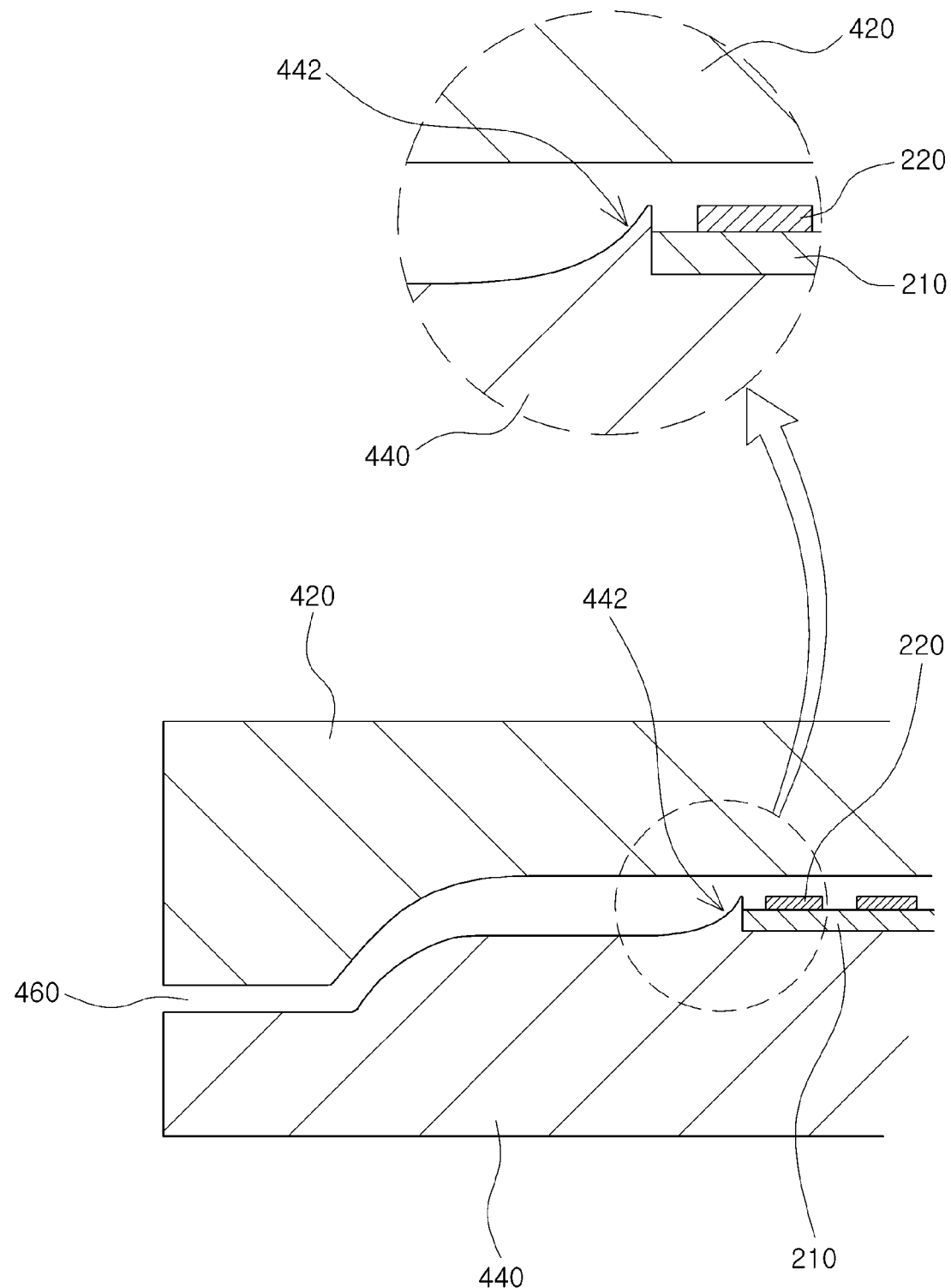
FIG. 26 is a cross-sectional view showing a second modified example of part D of FIG. 23.
Figure 27:
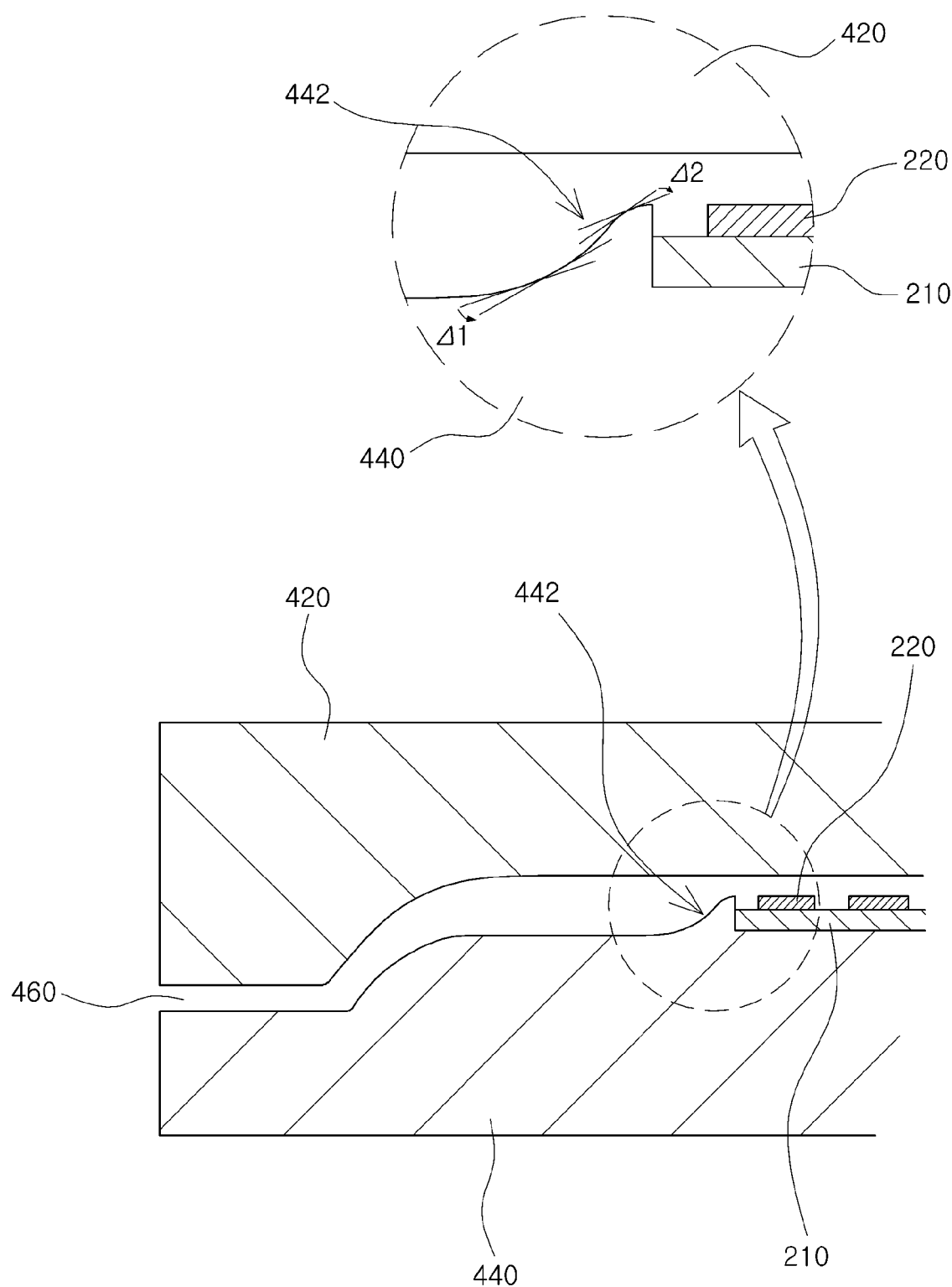
FIG. 27 is a cross-sectional view showing a third modified example of part D of FIG. 23.

FIG. 23 is a cross-sectional view showing a modified example of a mold of a case of a mobile communications terminal according to an exemplary embodiment of the present invention; FIG. 24 is an enlarged cross-sectional view schematically showing part D of FIG. 23; FIG. 25 is a cross-sectional view schematically showing a first modified example of part D of FIG. 23; FIG. 26 is a cross-sectional view schematically showing a second modified example of part D of FIG. 23; and FIG. 27 is a cross-sectional view schematically showing a third modified example of part D of FIG. 23.

Modified Example of Mold of Case of Electronic Device Having Antenna Pattern Embedded Therein FIGS. 23 through 26 show a mold 400 of a case of an electronic device to which the antenna pattern frame 200 according to the first exemplary embodiment is applied.

However, all of the above-mentioned antenna pattern frames 200 according to the respective exemplary embodiments may be applied to modified examples of a mold of a case of an electronic device described below.

Referring to FIGS. 23 and 24, the outer boundary jaw 442 defining the outer boundary of the radiator frame 210 may include an inclination part 4422 guiding an injection molding product to be inclined upwardly or downwardly within the case frame shaped inner space 450 and a flat part 4424 guiding the injection molding product upward of the radiator frame 210 horizontally.

The inclination part 4422 of the outer boundary jaw 442 may have a tangential gradient of a bottom surface increased or decreased in a moving direction of the injection molding liquid.

The outer boundary jaw 442 close to the resin material inlet 460 may have a tangential gradient of a bottom surface increased in the moving direction of the injection molding liquid, and the outer boundary jaw 442 shown in FIG. 23 distant from the resin material inlet 460 may have a tangential gradient of a bottom surface decreased in the moving direction of the injection molding liquid.

Referring to FIG. 25, a modified example of a mold 400 for a case of an electronic device in which a height $H_2$ of the radiator frame 210 corresponds to a height $H_1$ of the flat part 4424 of the outer boundary jaw 442 is shown. When the height $H_2$ of the radiator frame 210 is the same as the height $H_1$ of the flat part 4424 of the outer boundary jaw 442 as described above, a vortex phenomenon due to a direction conversion of the injection molding liquid in the case frame shaped inner space 450 may be reduced.

Referring to FIG. 26, unlike the example of FIGS. 23 and 24, a modified example of a mold 400 for an electronic device case including the outer boundary jaw 442 without the flat part 4424 is shown.

In the present modified example, a height of the outer boundary jaw 442 may correspond to that of the radiator frame 210.

Referring to FIG. 27, unlike the example of FIGS. 23 and 24, an inclination part of the outer boundary jaw 442 having a sine wave shape is shown.

That is, a tangential gradient Δ1 of a bottom surface of the outer boundary jaw 442 may be increased and then decreased to a tangential gradient Δ2, based on the outer boundary jaw 442 close to the resin material inlet 460. This structure may reduce resistance of movement of the injection molding product.

Also in the present modified example, the height of the outer boundary jaw 442 may correspond to that of the radiator frame 210.

In a method of interconnecting the antenna pattern frames according to the exemplary embodiments, the shapes of the antenna pattern part and the connection terminal part or the method of manufacturing the same, and the mold as described above, may be appropriately combined with the methods described in other exemplary embodiments according to the purpose of the frequency band.

As set forth above, with regard to the case of an electronic device having the antenna pattern embedded therein, the mold and the method of manufacturing the same according to the exemplary embodiments of the present invention, the radiator having the antenna pattern part formed therein may be embedded in the case of the electronic device, whereby defects, such as vulnerability to external impacts in the case of the exterior type antenna according to the related art, and an increase in product volume in the case of the interior type antenna according to the related art may be solved.

In addition, the low frequency antenna may be implemented in a miniaturized electronic device, whereby low frequency broadcasting may be received without a separate exterior antenna in a small apparatus and the low frequency antenna may be variously applied as an antenna for radio frequency identification (RFID) communication, a wireless charging type antenna, and the like.

Further, the antenna pattern frame is not moved or deformed within the mold of the case of the electronic device in which the injection molding is performed at a high temperature and at a high pressure, whereby a rate of defectivity in an appearance may be reduced and the performance of the antenna may be improved.

Furthermore, the antenna film is not adhered to the outer surface of the case, whereby the defect in which an antenna film is separated from the case due to the elasticity of the antenna film itself may be solved.

Moreover, the antenna pattern frame may be applied to all electronic devices requiring an antenna by manufacturing a case of the electronic device having the antenna pattern part embedded therein, whereby the antenna pattern frame may be variously applied.

While the present invention has been shown and described in connection with the exemplary embodiments, it will be apparent to those skilled in the art that modifications and variations can be made without departing from the spirit and scope of the invention as defined by the appended claims.

What is claimed is:

1. A case of an electronic device having an antenna pattern embedded therein, the case comprising:
   a radiator frame having a through hole, a radiator including an antenna pattern part disposed on a surface of the radiator frame, the antenna pattern part being apart from the through hole with a predetermined distance; and
   a case frame covering the radiator frame such that the case frame is secured to the radiator frame via the through hole.

2. The case of claim 1, wherein the antenna pattern part includes a loop antenna wound around an outer portion of the through hole.

3. The case of claim 1, wherein the radiator frame and the case frame are integrally formed.

4. The case of claim 2, further comprising a through hole boundary groove formed at a boundary between the case frame and the through hole.

5. The case of claim 4, wherein the through hole boundary groove has an inclination, a depth of which becomes shallower in a direction from the through hole toward the case frame formed at an inner portion of the through hole.

6. The case of claim 1, further comprising an outer boundary groove formed at a boundary between an outer portion of the radiator frame and the radiator frame.

7. The case of claim 6, wherein the outer boundary groove has an inclination, a depth of which becomes shallower in a direction from the radiator frame toward the case frame formed at an outer portion of the radiator frame.

8. The case of claim 1, wherein the antenna pattern part includes an antenna coil wound multiple times so that a low frequency signal may be transmitted or received.

9. The case of claim 8, wherein the radiator frame includes an over-mold part covering a portion of each of adjacent antenna pattern parts.

10. The case of claim 8, wherein the radiator frame includes an over-mold part covering all antenna pattern parts adjacent thereto.

11. The case of claim 1, wherein the radiator includes a connection terminal part formed on one surface of the radiator frame, and the connection terminal part is injection molded to be exposed on a connection terminal support formed to protrude to an outer portion of the radiator frame.

12. The case of claim 9, wherein the connection terminal support includes an interconnection hole formed in a position corresponding to that of the connection terminal part.

13. The case of claim 1, wherein the radiator frame includes an outer jaw disposed to be higher than an upper surface of the radiator.

14. The case of claim 1, wherein the radiator includes at least two differently patterned antenna pattern parts.

15. The case of claim 1, wherein the film is made of a polymer plastic material containing a Cu component.

16. The case of claim 1, wherein the case frame is engaged with the radiator frame via the through hole via molding.

17. A case of an electronic device having an antenna pattern embedded therein, the case comprising:
- a radiator frame injection molded so that a radiator including an antenna pattern part and formed on a film is formed on one surface thereof;
- a case frame injection molded upwardly of the radiator frame and provided with the radiator embedded between the radiator frame and the case frame; and
- a boundary part forming a boundary between the radiator frame and the case frame and having a groove formed inwardly of the case frame,
- wherein the radiator frame includes a through hole, and the through hole is inserted into an inner boundary jaw of a mold of the case of an electronic device through which the case frame is injection molded.

18. The case of claim 17, further comprising a through hole boundary groove formed at a boundary between the case frame and the through hole.

19. The case of claim 17, further comprising an outer boundary groove formed at a boundary between an outer portion of the radiator frame and the radiator frame.

20. A case of an electronic device having an antenna pattern embedded therein, the case comprising:
- a radiator frame having a through hole, a radiator including an antenna pattern part disposed on a surface of the radiator frame, the antenna pattern part being apart from the through hole with a predetermined distance; and
- a case frame covering the radiator frame and having a mold portion being inserted to the through hole so that the case frame is secured to the radiator frame.

21. A case of an electronic device, the case comprising:
- a radiator frame comprising a through hole;
- an antenna pattern disposed on the radiator frame so that the antenna pattern surrounds the through hole; and
- a case frame attached to the radiator frame so that the antenna pattern is disposed between the radiator frame and the case frame;
- wherein the case frame comprises a projection extending into the through hole; and
- the projection comprises a boundary groove adjoining an edge of the through hole.

* * * * *